United States Patent
Pheiffer et al.

(10) Patent No.: US 7,680,032 B1
(45) Date of Patent: Mar. 16, 2010

(54) BIDIRECTIONAL LINE SWITCHED PARTIAL RINGS, MESH NETWORKS, AND METHODS OF OPERATION

(75) Inventors: Brian Pheiffer, Santa Clara, CA (US); Yalin Wang, San Jose, CA (US); Robert Bryttegard, San Jose, CA (US); Kyle McIntosh, Roswell, GA (US)

(73) Assignee: Ciena Corporation, Linthicum, MD (US)

( * ) Notice: Subject to any disclaimer, the term of this patent is extended or adjusted under 35 U.S.C. 154(b) by 1338 days.

(21) Appl. No.: 10/739,157

(22) Filed: Dec. 19, 2003

(51) Int. Cl.
*H04L 1/00* (2006.01)
(52) U.S. Cl. .................. 370/222; 370/258; 370/403; 398/4
(58) Field of Classification Search .......... 370/216, 370/228, 403–405, 221–225, 258, 907; 398/1–7
See application file for complete search history.

(56) References Cited

U.S. PATENT DOCUMENTS

| | | | | |
|---|---|---|---|---|
| 6,226,111 B1 * | 5/2001 | Chang et al. | ................. | 398/9 |
| 6,304,347 B1 * | 10/2001 | Beine et al. | ................. | 398/38 |
| 6,616,350 B1 * | 9/2003 | de Boer et al. | ................. | 398/9 |
| 6,795,394 B1 * | 9/2004 | Swinkels et al. | ............ | 370/222 |
| 6,853,811 B2 * | 2/2005 | Wahler et al. | ................. | 398/7 |
| 7,046,619 B2 * | 5/2006 | Alagar et al. | ................. | 370/216 |
| 7,072,584 B1 * | 7/2006 | Lichtman et al. | ............. | 398/59 |
| 7,106,969 B1 * | 9/2006 | Lichtman et al. | ............. | 398/59 |
| 7,313,088 B2 * | 12/2007 | Mazzurco et al. | ............ | 370/217 |
| 7,317,681 B1 * | 1/2008 | Ben-Dvora et al. | ......... | 370/224 |
| 2003/0086368 A1 * | 5/2003 | Limaye et al. | ............. | 370/216 |
| 2003/0214962 A1 * | 11/2003 | Allaye-Chan et al. | ....... | 370/406 |

* cited by examiner

*Primary Examiner*—William Trost, IV
*Assistant Examiner*—Roberta A Shand
(74) *Attorney, Agent, or Firm*—Clements Bernard PLLC; Christopher L. Bernard; Tyler S. Brown

(57) ABSTRACT

A bi-directional line switched mesh includes at least one bi-directional line switched ring (BLSR) sharing a common section with a partial bi-directional line switched ring (PBLSR). The partial bi-directional line switched ring has no working traffic along the common section, but may utilize the protection bandwidth associated with the common section of the BLSR in the event of a span failure of the PBLSR. Both electrical and optical PBLSR networks are also disclosed including methods of operating the asymmetrical ring nodes having unconfigured working ports (spans).

32 Claims, 28 Drawing Sheets

Single Ring

Dual Ring

|   | 1 | 2 | 3 | 4 | 5 | 6 |
|---|---|---|---|---|---|---|
| 1 | -- | 1 |   |   | 1 |   |
| 2 | 1 | -- | 1 |   |   |   |
| 3 |   | 1 | -- |   |   |   |
| 4 |   |   |   | -- |   | 1 |
| 5 | 1 |   |   |   | -- |   |
| 6 |   |   |   | 1 |   | -- |

FIG. 5B

BIDIRECTIONAL LINE SWITCHED PARTIAL RINGS, MESH NETWORKS, AND METHODS OF OPERATION

BACKGROUND OF THE INVENTION

1. Field of the Invention

The present invention relates generally to optical ring and mesh networks. More particularly, the present invention is directed to bi-directional line switched partial rings and mesh networks composed of full and/or partial rings.

2. Description of Background Art

Bi-directional line-switched rings (BLSRs) are an important class of networks. In a BLSR network, working traffic can be carried along both directions of the ring. Each optical fiber in the ring supports transmission in one direction, either clockwise (CW) or counter-clockwise (CCW). During a normal mode of operation, working traffic is routed on the shortest optical path between two nodes in the ring. Half of the bandwidth between nodes is reserved for protection traffic, what is sometimes also known as protection bandwidth or protection channel access (PCA). Since the protection bandwidth is shared amongst all of the working traffic for any single fiber failure, the amount of bandwidth needed for protection is less than for a network using dedicated protection. But, because the switch is performed at the line level instead of each path level and requires little action at intermediate nodes, the switching times can be kept below the required limit of 50 milliseconds.

BLSR networks typically are configured with the spans coupling the nodes having either two-fibers or four-fibers. In a two fiber BLSR (2F-BLSR) each span has two fibers with one fiber assigned for CW traffic and the other fiber assigned for CCW traffic. In 2F-BLSR half of the bandwidth (channels or wavelengths) in a fiber are reserved for protection traffic (1513). In general, a 2F BLSR node may combine the working and protection bandwidth with associated multiplexers (354 also know as a working/protect splitter) onto one fiber. The switching equipment attached to these multiplexers within the node behaves like a 4F BLSR with half the capacity. Further details of conventional optical BLSR may be found in SONET Bi-directional Line Switched Ring Equipment Generic Criteria, GR-1230-CORE, Issue 4, December 1998 which is hereby incorporated by reference in its entirety In a conventional optical BLSR, the nodes do not perform wavelength conversion. Therefore, when the network element performs a line switch, the half of channels that are used for working traffic in the CW direction, must be the same wavelength as the half that is used for protection in the CCW direction. With the bandwidth arranged in this way, changing the direction of the traffic changes its traffic type from working to protect. Thus, during a failure when BLSR changes the direction of the traffic for traffic 1530 in FIG. 18 from CW to CCW (see rerouted traffic 1630 of FIG. 19). The traffic has not changed structure, but is now flowing on the protection bandwidth and can remain optical.

In a four fiber BLSR (4F-BLSR) each span has four fibers coupling each set of nodes with two of the fibers being working fibers and the other two protection fibers. Instead of splitting the bandwidth of one fiber, a whole fiber is dedicated to either working or protection. Therefore, one must change the fiber and direction of traffic to change the type of traffic from working to protect.

SONET BLSR may be deployed using an electrical switch at each node after converting the optical signal into the electrical domain (more precisely, an O-E-O (optical to electrical to optical) switch). SONET BLSR may also take the form of a so called "virtual line switched ring" as described in U.S. Pat. No. 6,654,341, filed Oct. 19, 1999 and granted Nov. 25, 2003 the entirety of which is hereby incorporated by reference.

Also, optical BLSR (O-BLSR) may be deployed using an optical switch at each node which does not require the signal to be converted into the electrical domain (e.g. O-O (optical-optical) switch), saving this extra cost and allowing for non-SONET services. The extensions discussed in this patent application apply to both the electrical and optical BLSR networks.

For O-E-O switches, the node deals with optical fiber and timeslots carried inside the fiber, and performs timeslot assignment function. For an O-O switch, O-BLSR deals with fiber and wavelengths carried inside the fiber, and performs switching at the optical level. For the invention discussed in this application, O-E-O network elements (nodes) and O-O network elements (nodes) deal with the "signals" in different formats/granularities, but use the same network construction and control principles disclosed below.

The switching equipment has at least four modes to support a BLSR network as illustrated in the diagrams of FIGS. 1c-g show bi-directional traffic with one bidirectional line with one bidirectional port at each end. These may be shown as two parallel lines of unidirectional traffic—having twice as many unidirectional ports):

(i) Normal (N) mode has the switch passing traffic directly from the client tributary Add/Drop Multiplexer (ADM) to the line access ports and vice-versa. Lower priority traffic may be carried on the bandwidth unused during normal operation. This is shown as the dotted lines in FIG. 1c. This traffic is lower priority because it is dropped during a network failure that requires the bandwidth to be used.

(ii) Ring-Switch West (RS-W) mode is used when the failed span is on the East side of this node and has the switch passing west working traffic to the west working OADM and east working traffic to the west protection OADM. The protection tributary client traffic is not used. See FIG. 1d. An optional bridging of traffic to both the protection and working line access at the same time is possible (as shown by the dotted line) in both the optical and electrical implementations. This optional bridging is useful for keeping the working line access signal alive to determine when the link is restored. If this bridging is not implemented, an out-of-band communication signaling is required.

(iii) Ring-Switch East (RS-E) mode is used when the failed span is on the West side of this node and has the switch passing east working traffic to the east working ADM and west working traffic to the east protection ADM. The protection tributary client traffic is not used. See FIG. 1e. As with switch mode (ii), an optional bridging to the original working line access is also useful.

(iv) Intermediate nodes are not directly connected to the failed span and use the Bridge (B) mode to pass protection traffic straight through the network element. This connects the working east and west tributary traffic to the working east and west line access ports. See FIG. 1f. The protection tributary access traffic is dropped. However, the protection line access traffic is passed through as shown as the dotted line in FIG. 1f.

(v & vi) Two additional modes are also useful in an electrical implementation to recover from some additional failures: the East and West Span (S) Switch shown in. These failures include a fiber failure if this is implemented as 4 fiber BLSR or a equipment or fiber failure in the ADM that drops the working traffic, but allows the protection channel to survive. This switch mode simply puts the normal working traffic on the protection line access for the same direction (East or West) as the normal working traffic's direction as further shown in FIG. 1g.

In electrical BLSR networks, the electrical switch matrix is an O-E-O switch that implements the above switching operations with an Add/Drop Multiplexer at a minimum, or may utilize a more general combination of time division and space switching to permit a time slot interchange and arbitrary switching of timeslots between multiple input ports and multiple output ports. Such a non-blocking electrical switch matrix has been described in Klausmeier, et al. U.S. Pat. No. 6,343,075 granted Jan. 29, 2002 and filed Oct. 26, 1999 which is hereby incorporated by reference in its entirety. Such switches are also commercially available such as the CoreDirector® intelligent optical switch sold by CIENA Corporation.

In accordance with the SONET standard, spans transfer units of information called Synchronous Transport Signals (STS). For the different optical carrier levels OC-n (such as OC-1, OC-3 and OC-12), there is a corresponding STS-n, where n is the number of STS-1 segments or time slots. Typical spans are composed of 1, 3, 12, 48, or 192 STS-1's. All SONET spans transmit 8,000 frames per second, where each frame is composed of an integer number of STS-1 segments, such as 1, 3, 12, 48 or 192.

In an optical BLSR network each node has a ring switch module (also known as a ring switch matrix) that permits at a minimum the working traffic from a source node to be redirected onto the protection bandwidth in response to a line fault or node failure. The protection traffic is directed along an alternate optical path to a destination node that avoids the defect. Low priority "extra traffic" that may in a normal mode utilize the protection bandwidth is sacrificed to ensure that higher priority working traffic is directed to its destination. A general purpose optical space-switch may be used to provide this switching function.

FIG. 1A illustrates an exemplary and conventional BLSR network 100 having nodes 101, 102, 103, and 104. Each node includes a ring switch module (not shown) to switch working traffic either optically or electrically. Working paths between two nodes, node 101 and node 103, are shown for a normal mode of operation. As indicated in FIG. 1B, responsive to detecting a line failure (e.g., a loss of signal or a degraded signal condition) between nodes 101 and 104, the nodes detecting the line failure initiate a ring switch to redirect traffic away from the failed line using the protection capacity bandwidth.

One benefit of the conventional BLSR topology is that it efficiently utilizes protection bandwidth. However, one drawback of a conventional BLSR topology is that it requires working bandwidth to be available even when it is not used. This unused bandwidth also requires unused switching equipment, unused transponders and unused transport fiber.

Additionally, another drawback of the conventional BLSR topology is that it is difficult to implement an arbitrary mesh topology in a cost-effective manner. Referring to FIG. 2A, a single ring BLSR network 280 has nodes 201, 202, 203, 204, 205, and 206. However, for a particular application it may be desirable to form direct data links between nodes 202 and 205 to improve the quality of service and/or data capacity of the network. This results in mesh topology.

Conventionally, a mesh topology may be implemented as dual full BLSRs 200, as shown in FIG. 2B. A first full (complete) BLSR 220 includes nodes 201, 202, 204, and 205. The second full BLSR 230 includes nodes 207, 203, 206, and 208. Each BLSR 220 and 230 has its own working and protection bandwidth and acts as a conventional BLSR with half the bandwidth of each span reserved for protection traffic. However, as indicated by dashed lines 250, nodes 202, 205, 207, and 208 include an element, such as an optical-to-electrical (OEO) cross-connect (not shown) to permit data to be transferred between the BLSRs 220 and 230.

Comparing the dual BLSR network 200 with a single ring BLSR network, it can be seen that a dual BLSR ring network 200 greatly increases the equipment requirements compared with a single ring BLSR 280. In the example of FIG. 2B, at least two additional nodes and two associated spans are required to implement a link between node 202 and node 205. Additionally, high data rate electrical/optical cross-connect is typically required to couple data between the rings, further increasing the incremental hardware costs.

What is desired is a flexible BLSR protection scheme that does not require bandwidth and equipment when not needed and an optical network design that combines the benefits of a mesh topology and the benefits of bi-directional line switching with reduced hardware requirements.

SUMMARY OF THE INVENTION

A Partial or Asymmetrical BLSR ring does not need to provide bandwidth for the working traffic on all spans. It is noted that the term "partial BLSR" and "asymmetrical BLSR" are terms that are used interchangeably herein. If some spans have less need to carry working traffic due to geographical or population reasons, the extra working bandwidth can either be used for another network or simply not installed. In the case of Partial/Asymmetrical 4F-BLSR, not all four Fibers (working pair and protection pair) and associated equipment have to be presented for all spans along the ring, if the working service (bandwidth) is not required between two adjacent nodes. In the case of a partial 2F-BLSR, the unused working bandwidth is still available on the fiber, but may be reallocated for another purpose.

The key functions of conventional 4F BLSR are to provide span protection switching and ring protection switching. A major benefit of partial/Asymmetrical BLSR is that it provides the same levels of protection for working traffic of standard 4F BLSR with reduced equipment and fiber deployment (reduced cost).

To achieve ring switch functions upon network failures on any span, partial 4F BLSR should at least have a closed fiber ring for protection channels. The fiber pair for working channels need only be installed if there is bandwidth demand. From general topology point view, the fiber pair carrying working channels (both Tx (transmitter) and Rx (receiver)) forms an open or partial ring (arc); and the fiber pair carrying protection channels (both Tx and Rx) forms a closed ring.

In the case of 2F-BLSR, both working channels and protection channels are physically located in the same fiber pair, and only ring switch is possible in standard 2F BLSR upon a failure. With the help of interconnected mesh network, as long as adequate bandwidth can be provided (or found) through the interconnected mesh network (together with DCC channel for control traffic), the partial ring concept can also be used for 2F BLSR. In this case, the physical 2F BLSR ring is actually an open ring, but protection channels are closed via the bandwidth provided via mesh networks. In another case, the physical 2F BLSR ring is a closed ring but working channels on some span(s) are devoted for other rings or mesh network, i.e., the traffic on these channels are not protected by the protect ring.

With much less equipment and optical fiber, Partial/Asymmetrical BLSR can provide the same level of network reliability comparing with normal 4F BLSR. The significance of Partial BLSR is that it reduces network build out cost without compromise working traffic survivability. User can also add working bandwidth (point-to-point fibers and line interfaces) and turn on new services while the ring is carrying live services, as the working traffic demand increases on a given span.

Asymmetrical BLSR concept can also be applied to sharing protection channels among multiple closed or open working rings (such as FIG. 10, 11, 12). This further reduces fiber and optical port consumption for the same amount of working traffic (services). An in-service working span extension ("pay-as-you-grow") concept in conjunction with flexible and arbitrary port selection on network elements (nodes) and service provision mechanism are other aspects of this invention.

In the pay-as-you-grow concept, the initial four node ring, for example, is configured as FIG. 13, which has working spans between Node 1301 and 1303, 1301 and 1302. The ring can be put into service as it designed. If more service demand requested between node 1303 and 1304, the working span between these nodes can be added to extend the ring as same as the topology of FIG. 8. The ring can be further extended by adding another working span between node 1302 and 1304. After this extension, the ring becomes a closed normal 4F BLSR ring, as same as the topology of FIG. 7.

O-E-O switches providing Partial BLSR capability are should also have all standard BLSR functions. In addition, the switch needs to support an additional configuration mode that allows configuring BLSR protection group with protection port (or protection channels for 2 fiber case) only. Missing (nor provisioned or constructed) working span between two adjacent nodes should be considered as a supported configuration type, and this information should be carried in the topology information and Ring Map (i.e., Ring Map, that includes a complete order of the nodes on the ring) available on all nodes forming the closed protection ring. For example, the ring map for FIG. 8 would look like the set of ID of Node 801, ID of Node 802, ID of Node 804, ID of Node 803. In this example, the Node ID is a digital number between 1 and 16 assigned by user. The topology information should include the port ID of each working and protect segment.

The data communication channel (DCC) must be provided by protection fiber, or a combination of working and protect fibers of individual spans across the ring.

A system and method is disclosed for implementing bi-directional line switched network using a partial ring (FIG. 8 and FIG. 9) and an arbitrary mesh network as sub-networks of coupled bi-directional line switched full and partial rings (FIGS. 10-12). A partial ring may utilize half of its bandwidth when no working traffic is traveling across that span. Additionally, the protection bandwidth may be shared on another span if bandwidth is available. Further, a mesh may be created of two or more bi-directional line switched rings (BSLRs) sharing a common section that includes at least two common (shared) nodes and one common (shared) span. The first BLSR has both working traffic and protection traffic that traverses the common section. The second BLSR has no working traffic that traverses the common section. However, protection traffic for the second BLSR may traverse the common section utilizing the protection bandwidth associated with the common section.

In one embodiment, the first BLSR has precedence over the protection bandwidth and in the event of faults in both BLSRs, the first BLSR is allocated all of the protection bandwidth of the common section.

BRIEF DESCRIPTION OF THE DRAWINGS

The patent or application file contains at least one drawing executed in color. Copies of this patent of patent application publication with color drawings will be provided by the Office upon request and payment of the necessary fee.

FIG. 5B is a table showing an exemplary traffic matrix according to the principles of the invention for the network of FIG. 5A.

FIG. 13 together with FIGS. 8 and 7 show the network upgrade progressing, and a pay-as-you-grow concept.

The figures depict a preferred embodiment of the present invention for purposes of illustration only. One of skill in the art will readily recognize from the following discussion that alternative embodiments of the structures and methods disclosed herein may be employed without departing from the principles of the claimed invention.

DETAILED DESCRIPTION OF THE PREFERRED EMBODIMENTS

The present invention describes partial bi-directional line switched rings and a bi-directional line switched mesh (BLSM) network in which the mesh is segmented into multiple bi-directional line switched ring (BLSR) subnetworks. This allows two or more of the BLSRs may share protection bandwidth along a common section. These rings may be each be either FULL or PARTIAL rings depending on the amount of fiber available.

Partial Rings

Figure 8:
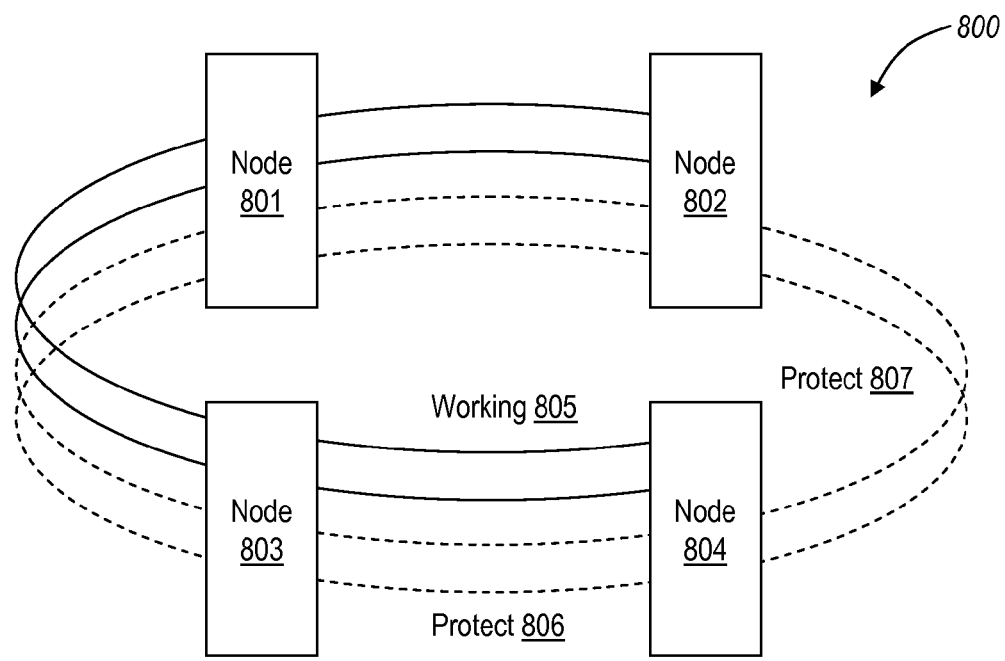
FIG. 8 shows an exemplary embodiment of a PARTIAL 4 node 4F-BLSR network according to the principles of the invention.

FIG. 8 shows a high-level view of a PARTIAL 4 node 4F-BLSR network 800 with four nodes 801, 802, 803 and 804 connected together with four fibers on three spans and two fibers on one.

It is to be understood that the terms "partial network", and "partial ring" refer to a ring network in which at least one of the working spans is missing, not configured, not provisioned, or otherwise not part of the ring. Similarly, the network elements or nodes that make up such a partial ring have two distinct varieties: a symmetrical ring node in which the working and protect ports (or spans) are both provided and provisioned and an asymmetrical ring node in which there is an asymmetry between the working and protect ports such that there is at least one working port (or span) that is not provided or provisioned.

Figure 7:
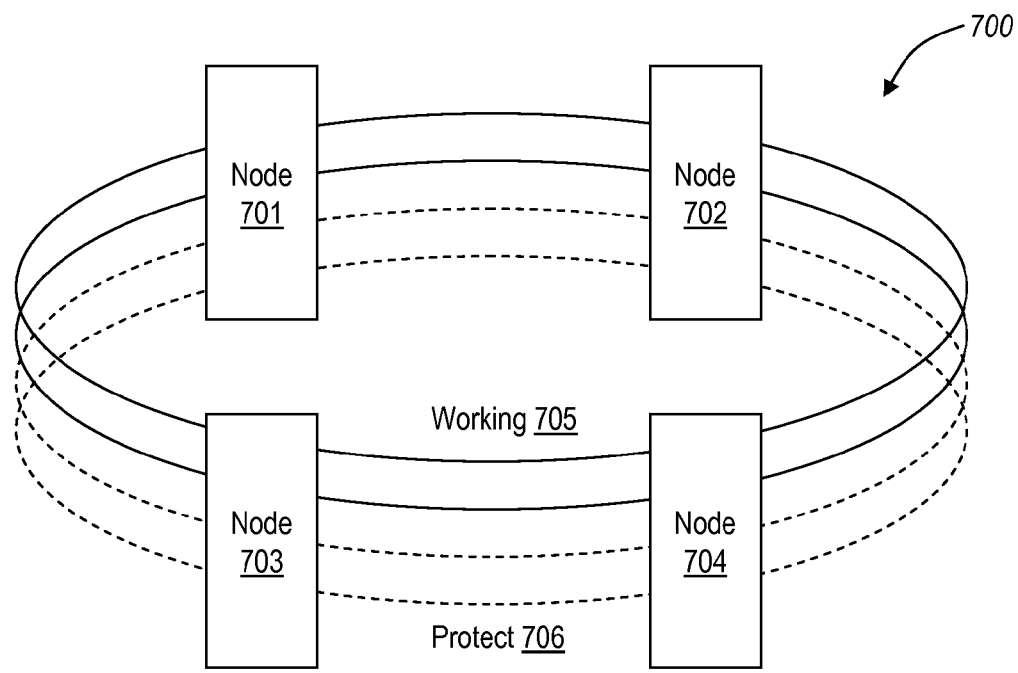
FIG. 7 shows a conventional FULL 4 node 4F-BLSR network in which the four nodes 701, 702, 703 and 704 are connected together with four fibers.

The FIG. 8 network is in contrast to a conventional Full 4 node 4F-BLSR ring 700 shown in FIG. 7. In the partial ring of FIG. 8, pair of working fibers are missing between asymmetrical ring nodes 802 and 804; only the protection pair 807 is required if no traffic is demanded provisioned between 802 and 804. However, two fibers between nodes 803 and 804 are reserved for working (one for clockwise traffic and one for counterclockwise traffic): 805 to allow working traffic. Two fibers are also reserved for protection (one for clockwise traffic and one for counterclockwise traffic): 806. This network 800 may be upgraded to the 700 network by adding fibers and network interfaces (ports) to close the working ring without affecting the other traffic in the ring; likewise, if traffic is no longer needed a span in network 700, it may be downgraded to network 800 without affecting the other traffic in the ring.

While the protection bandwidth must always be present on every span, the working bandwidth is optional in a PARTIAL BLSR. The nodes must be made aware of the unused (or unavailable) working bandwidth by provisioning the span in this node as a partial span. Both sides may be partial, East or West or none. This provisioning information is used by the asymmetrical ring node to suppress certain alarms and operations normally present when the working span fails—which would occur with a missing fiber. Since the working fiber is not present, these alarms must be suppressed by the asymmetrical ring node in order for the network to function as desired. The node controller in the asymmetrical ring node may optionally prevent use of the unprovisioned working bandwidth by blocking cross-connects and circuit provisioning over the unavailable bandwidth. The asymmetrical ring node may optionally reduce the number of transceivers by the number of unused working ports.

Figure 9:
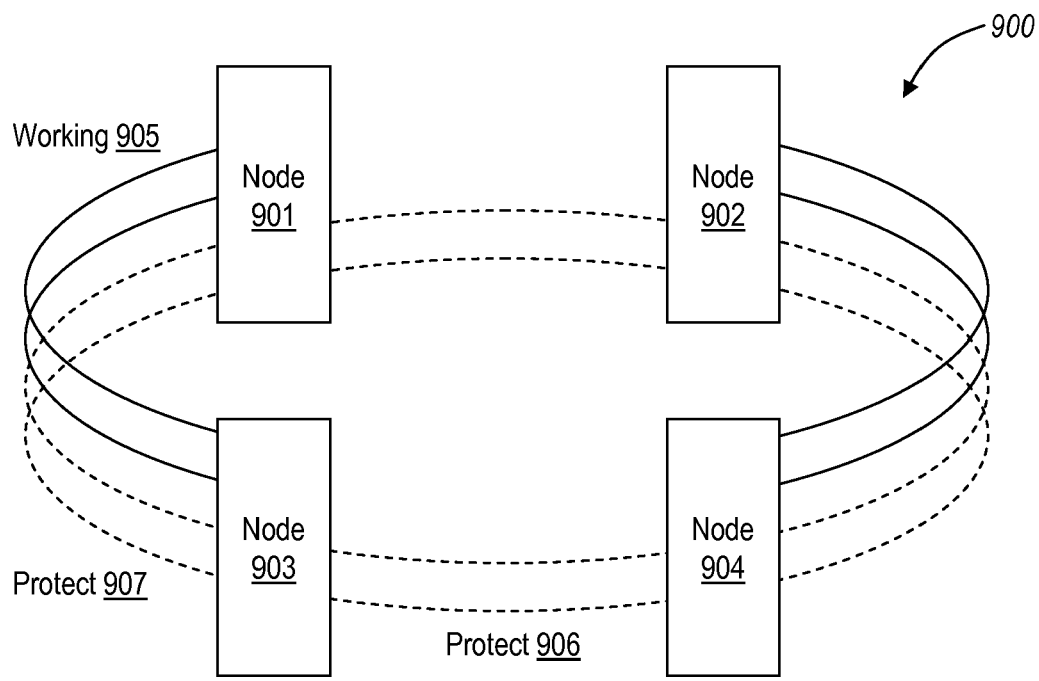
FIG. 9 shows an exemplary embodiment of another PARTIAL 4 node 4F-BLSR network according to the principles of the invention.

FIG. 9 shows an exemplary embodiment of another PARTIAL 4 node 4F-BLSR network. The four nodes 901, 902, 903 and 904 are connected together with four fibers on some spans and two fibers on others. A pair of working fibers are missing between asymmetrical ring nodes 901 and 902 and between asymmetrical ring nodes 903 and 904; only the protection pair 906 are required if no traffic is provisioned between nodes 903 and 904. However, two fibers between nodes 901 and 903 are reserved for working (one for clockwise traffic and one for counterclockwise traffic): 905 to allow traffic. Two fibers are also reserved for protection (one for clockwise traffic and one for counterclockwise traffic): 907. This network 900 may be upgraded to the 700 network or changed to the 800 network.

Shared Protection Bandwidth on a Common Span in a Mesh of Rings

Figure 10:
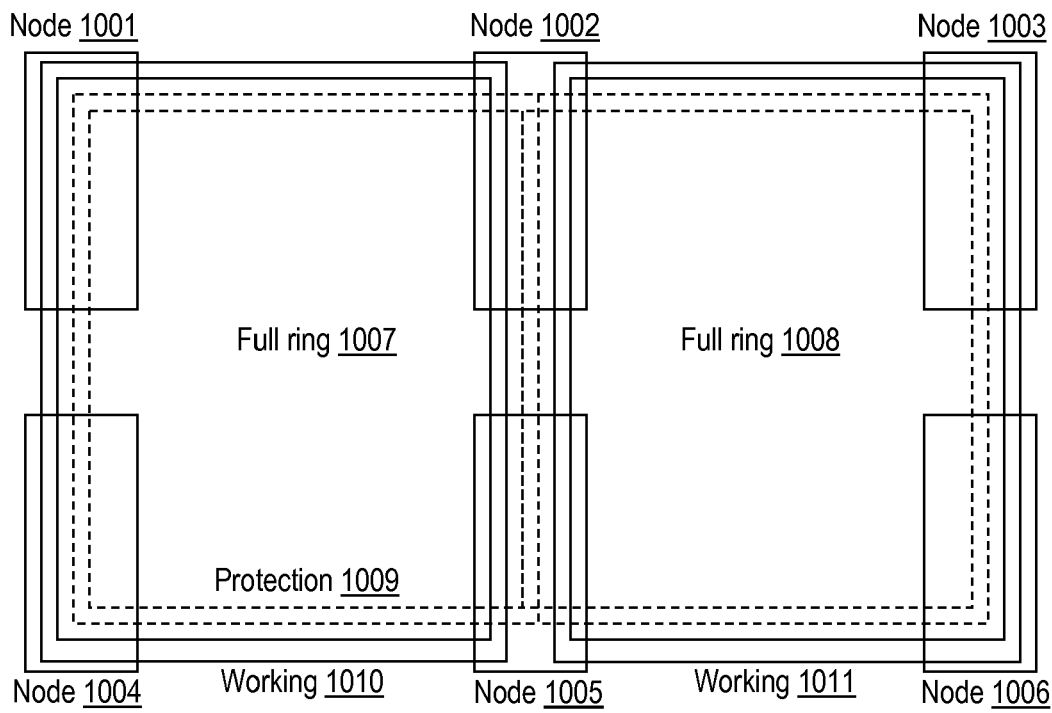
FIG. 10 shows an exemplary embodiment of two FULL 4 node 4F-BLSR networks sharing two of the nodes and sharing the protection bandwidth according to the principles of the invention.

BLSR rings may share protection bandwidth on a common span using the inventive techniques. FIG. 10 shows an exemplary embodiment of two FULL 4 node 4F-BLSR networks sharing two of the nodes and sharing the protection bandwidth. Therefore, only six nodes are needed: 1001, 1002, 1003, 1004, 1005, 1006. Nodes 1001, 1002, 1004, 1005 make up the first Full ring 1007. Nodes 1002, 1003, 1005, 1006 make up the second Full ring 1008. Nodes 1002 and 1005 are shared between both rings. The shared protection fiber is between nodes 1002 and 1005. Thus, instead of needing 8 fibers (4 for each full ring), only 6 fibers are needed on this span: 2 working fibers 1010 for ring 1007, 2 working fibers 1011 for ring 1008, and 2 shared protection fibers 1012 (dotted lines between 1002 and 1005).

Figure 15:
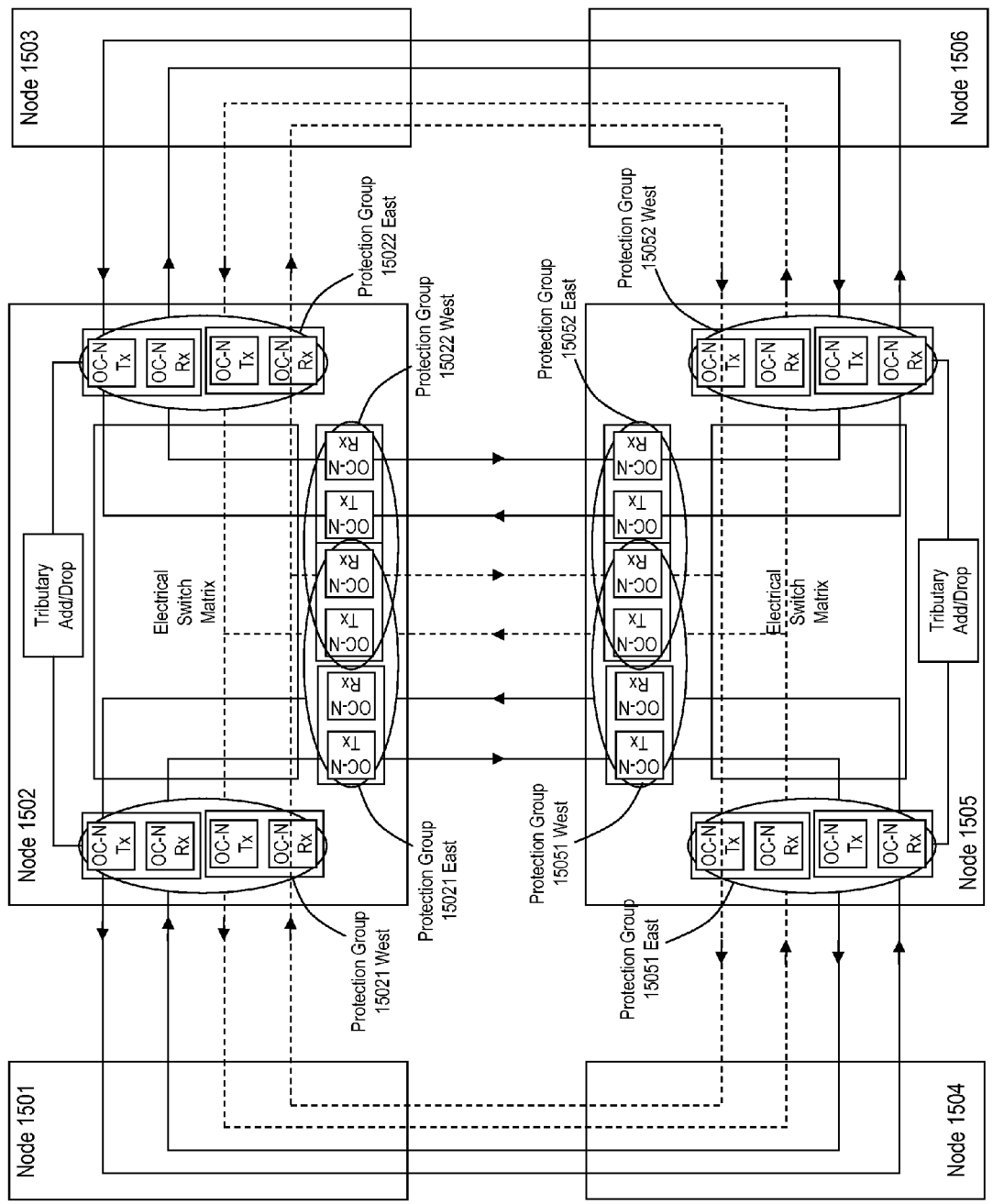
FIG. 15 shows the same network diagram of FIG. 10 with detailed ports, protection groups, and data path connections drawing according to the principles of the invention.

The detailed protection group configuration can be found in FIG. 15, where protection group 15021 East shares a pair of common port/fiber with protection group 15022 West. The same is true for 15051 West and 15052 East.

PARTIAL rings may be pieced together with other full and partial rings to form an arbitrary bi-directional line switched mesh (BLSM) network with even less bandwidth needed on the shared spans. As shown above, if two full rings were pieced together, the span in common between the two rings would require 3 pairs of fibers (2 pairs for working on each ring, plus one pair for shared protection). However, by employing differing combinations of shared bandwidth and partial rings, lower amounts of fiber (or wavelengths) are required.

Figure 11:
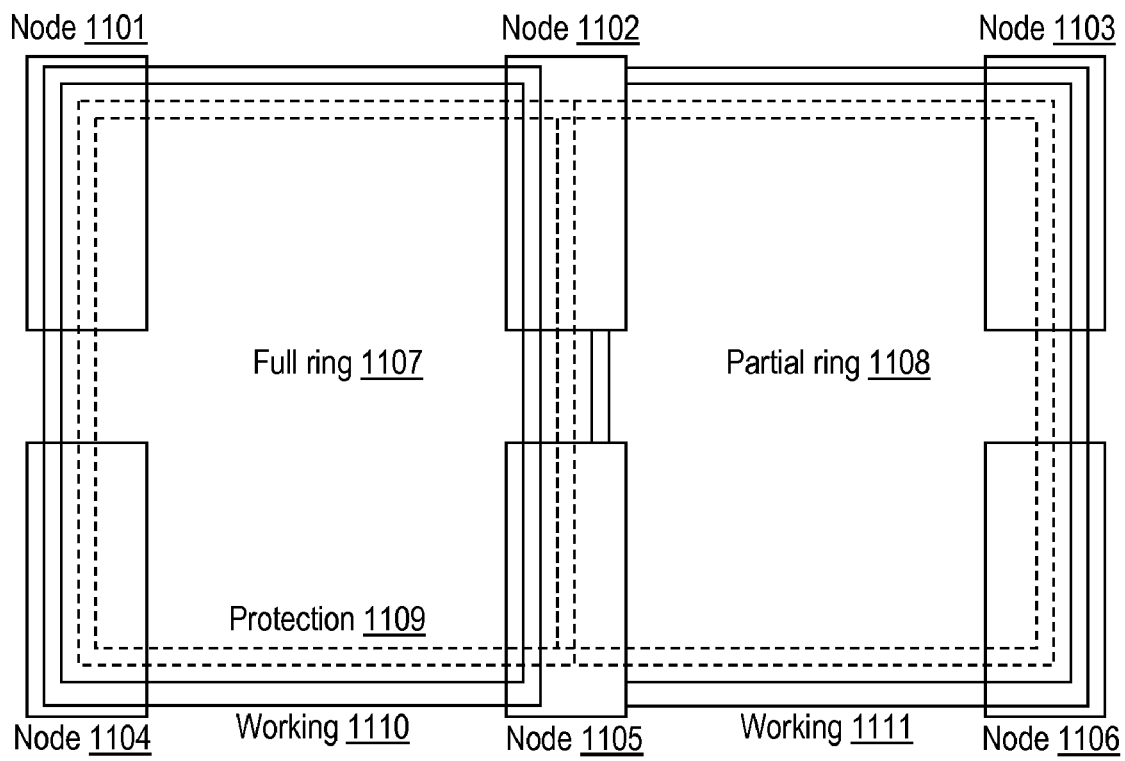
FIG. 11 shows an exemplary embodiment of one FULL 4 node 4F-BLSR network 1107 and one PARTIAL 4 node 4F-BLSR network 1108 sharing two of the nodes and sharing the protection bandwidth according to the principles of the invention.
Figure 16:
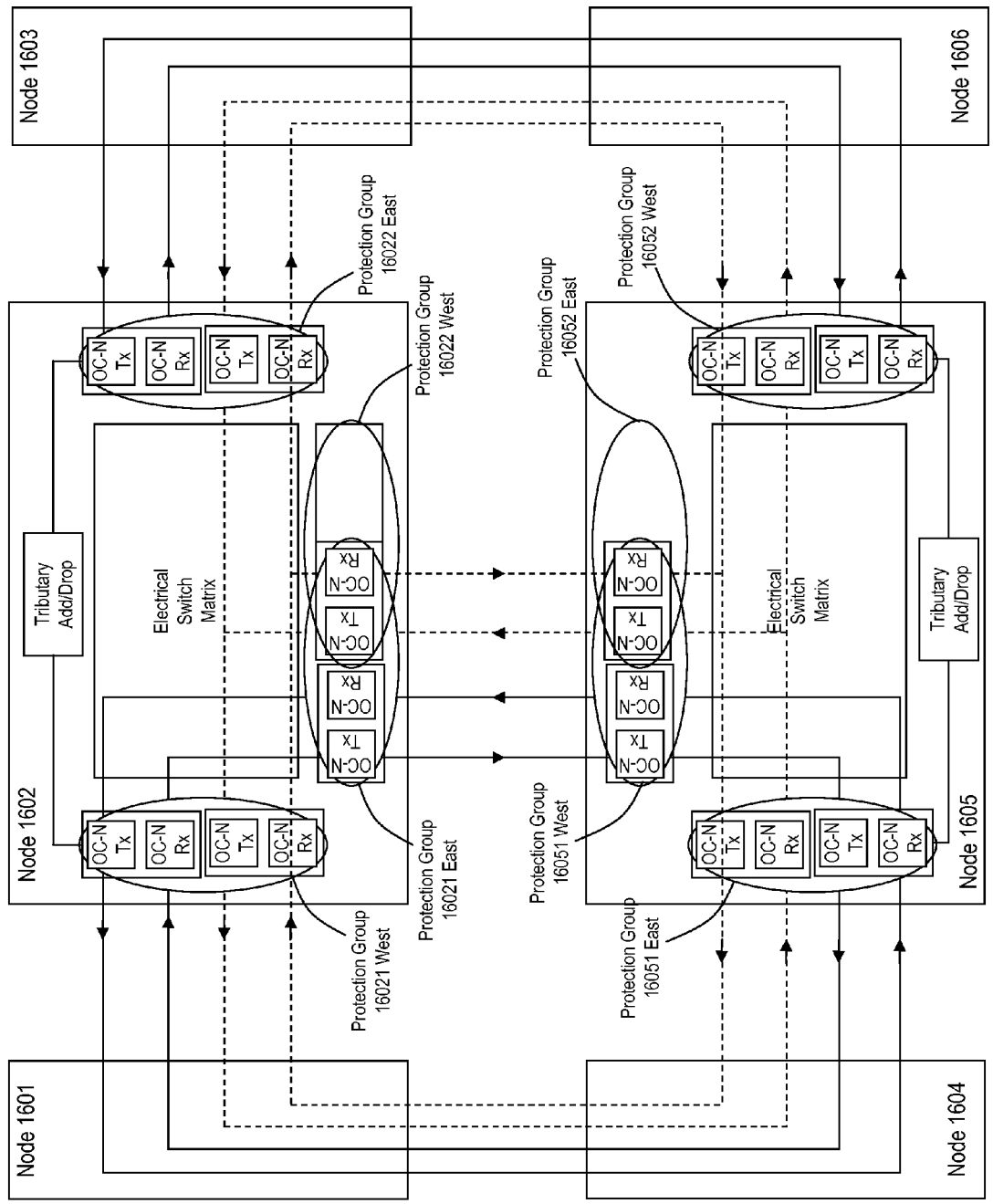
FIG. 16 shows the same network diagram of FIG. 11 with detailed ports, protection groups, and data path connections drawing according to the principles of the invention.

FIG. 11 shows an exemplary embodiment of one FULL 4 node 4F-BLSR network 1107 and one PARTIAL 4 node 4F-BLSR network 1108 sharing two of the nodes and sharing the protection bandwidth. Therefore, only six nodes are needed: 1101, 1102, 1103, 1104, 1105, 1106. Nodes 1101, 1102, 1104, 1105 make up the Full ring 1107. Nodes 1102, 1103, 1105, 1106 make up the PARTIAL ring 1108. Asymmetrical ring nodes 1102 and 1105 are shared between both rings. The shared protection fiber is between asymmetrical ring nodes 1102 and 1105. Thus, instead of needing 8 fibers (4 for each full ring), only 4 fibers are needed on this span: 2 working fibers 1110 for ring 1107, and 2 shared protection fibers 1109. The detailed protection group configuration can be found in FIG. 16, where protection group 16021 East shares a pair of common port/fiber with protection group 16022 West. The same is for 16051 West and 16052 East. One important thing to point out for FIG. 16 is that Protection Group 16022 West and 16052 East have one port each thereby making them asymmetrical as well.

Figure 12:
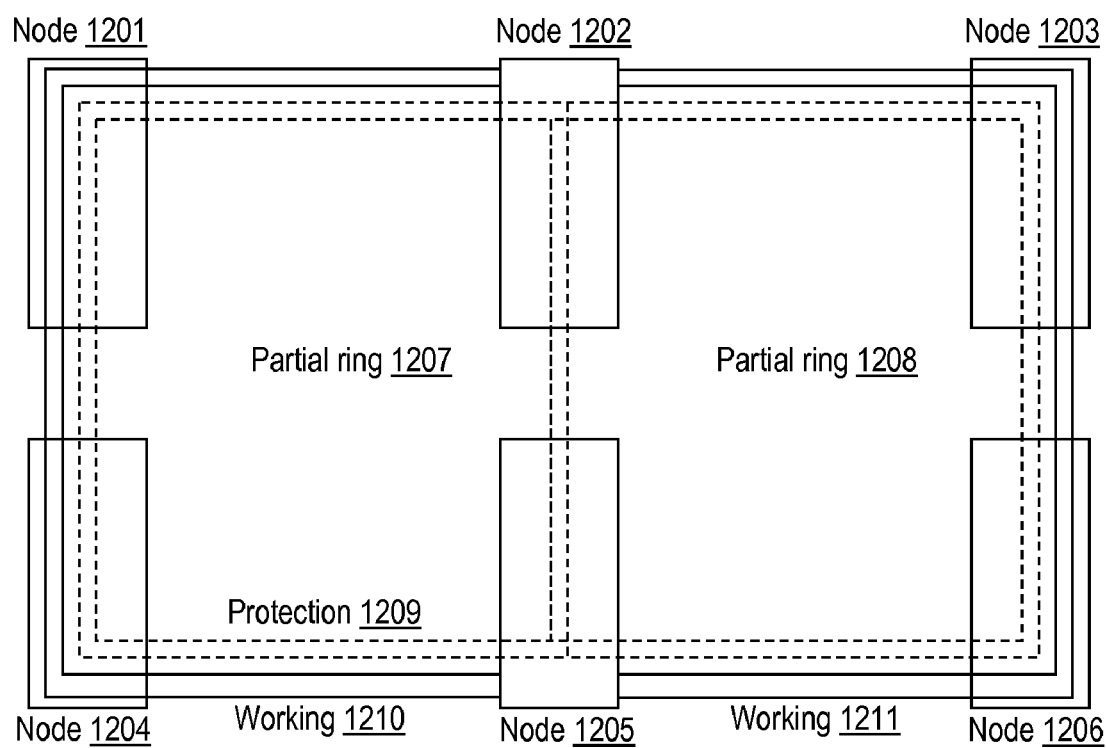
FIG. 12 shows an exemplary embodiment of two PARTIAL 4 node 4F-BLSR networks sharing two of the nodes and sharing the protection bandwidth according to the principles of the invention.
Figure 13:
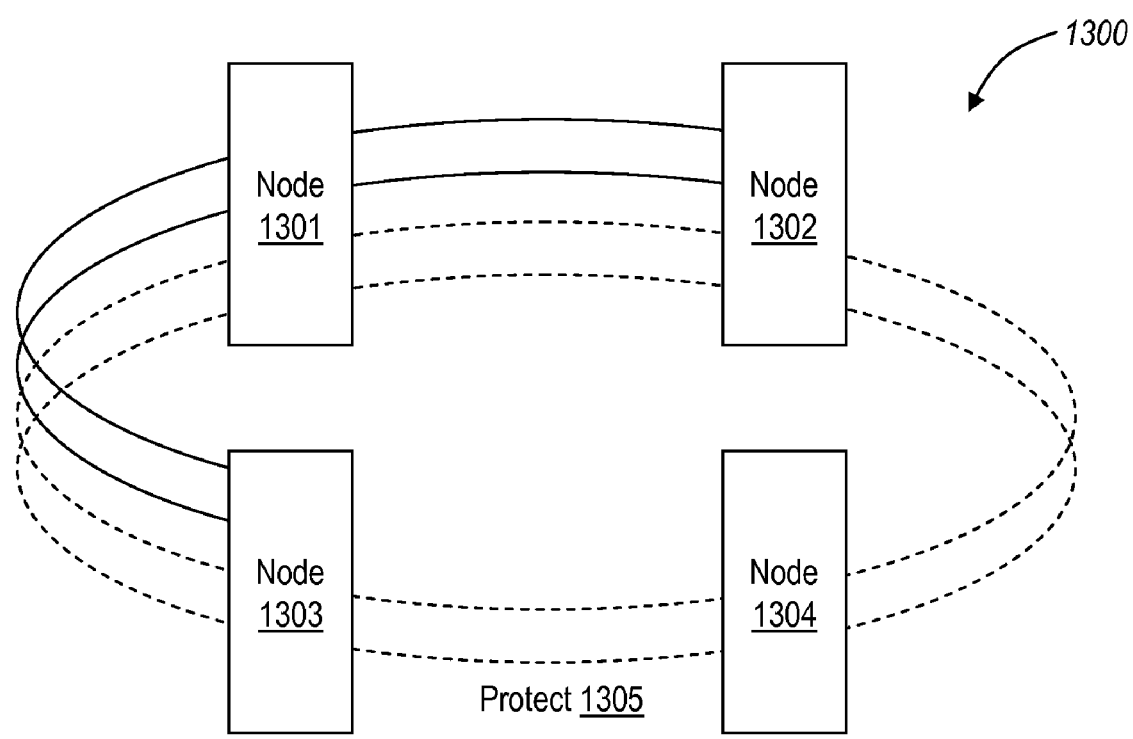
FIG. 13 shows another partial ring configuration according to the principles of the invention.
Figure 17:
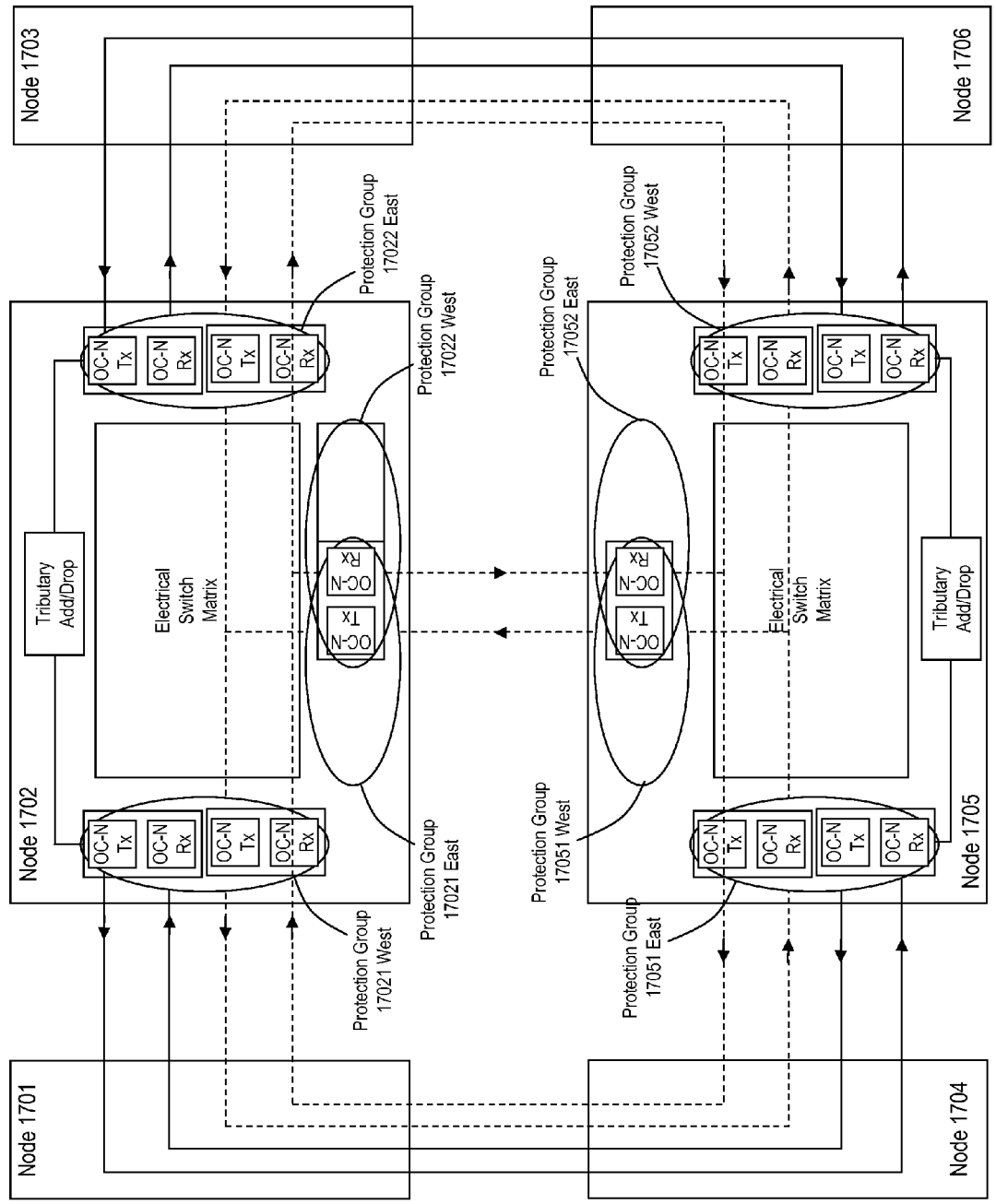
FIG. 17 shows the same network diagram of FIG. 12 with detailed ports, protection groups, and data path connections drawing according to the principles of the invention.
Figure 18:
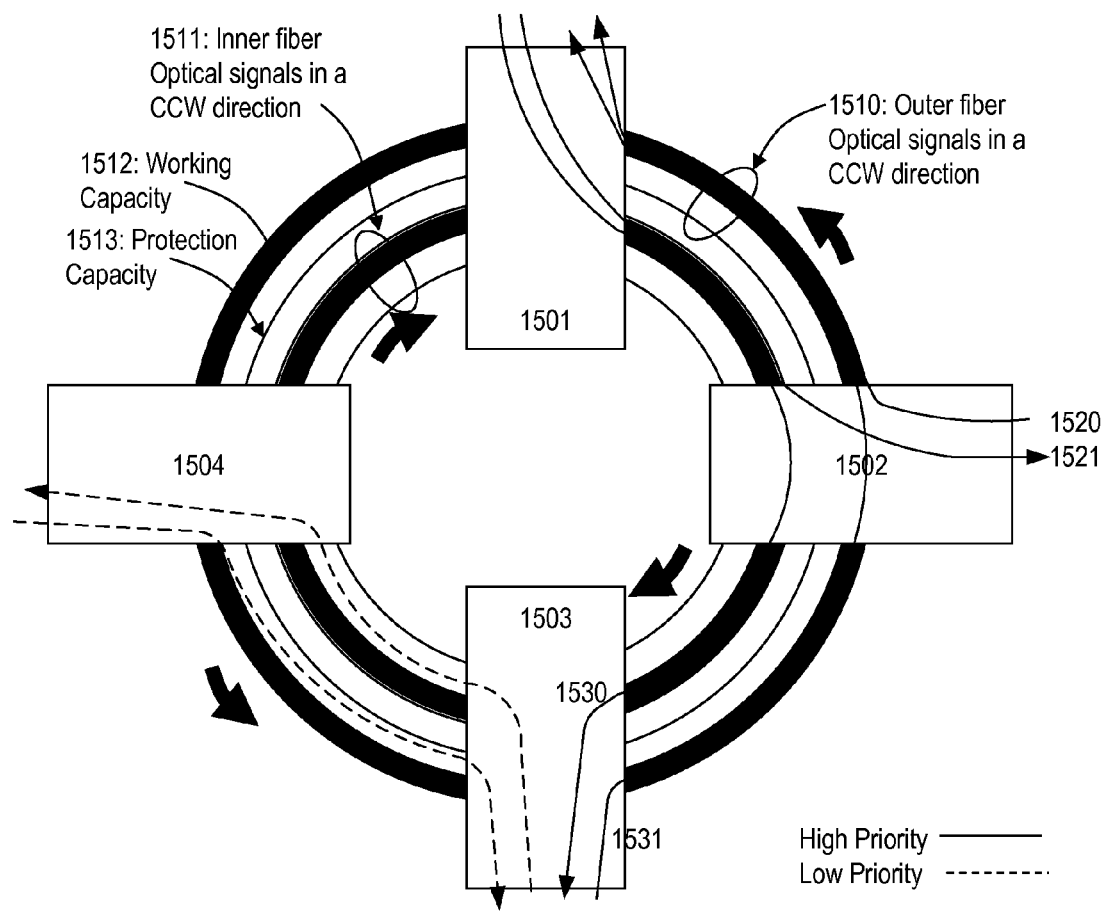
FIGS. 18 and 19 a conventional BLSR network before and after a protection switch.
Figure 19:
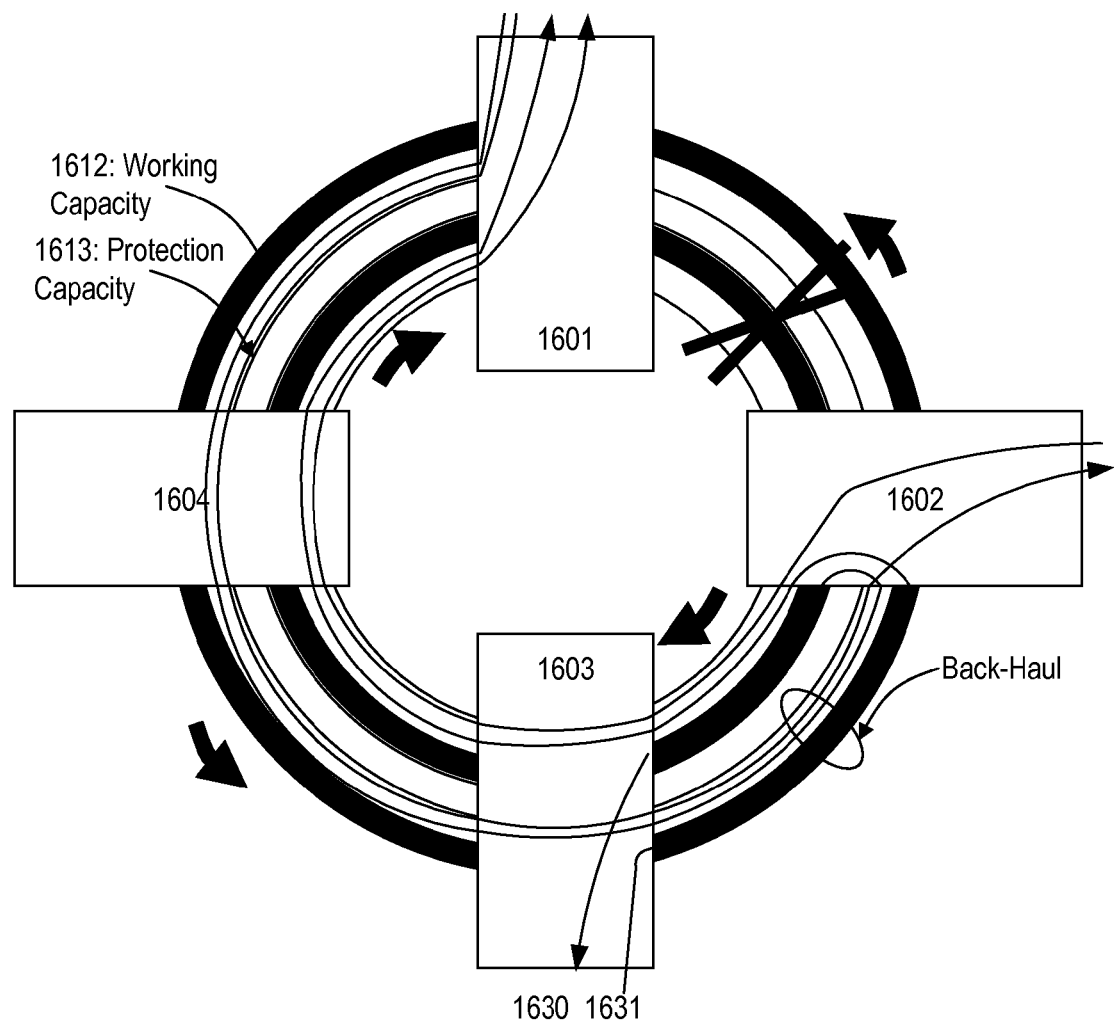

FIG. 12 shows an exemplary embodiment of two PARTIAL 4 node 4F-BLSR networks sharing two of the nodes and sharing the protection bandwidth. Therefore, only six nodes are needed: 1201, 1202, 1203, 1204, 1205, 1206. Nodes 1201, 1202, 1204, 1205 make up the first Partial ring 1207. Nodes 1202, 1203, 1205, 1206 make up the second Partial ring 1208. Asymmetrical ring nodes 1202 and 1205 are shared between both rings. The shared protection fiber is between nodes 1202 and 1205. Thus, instead of needing 8 fibers (4 for each full ring), only 2 fibers are needed on this span: 2 shared protection fibers 1209. The detailed protection group configuration can be found in FIG. 17, where protection group 17021 East shares a pair of common port/fiber with protection group 17022 West. The same is for 17051 West and 17052 East. One important thing to point out for FIG. 17 is that Protection Group 17022 West and 17052 East have one port each; and 17021 East and 17051 West have one port each thereby making them asymmetrical as well.

Figure 2A:
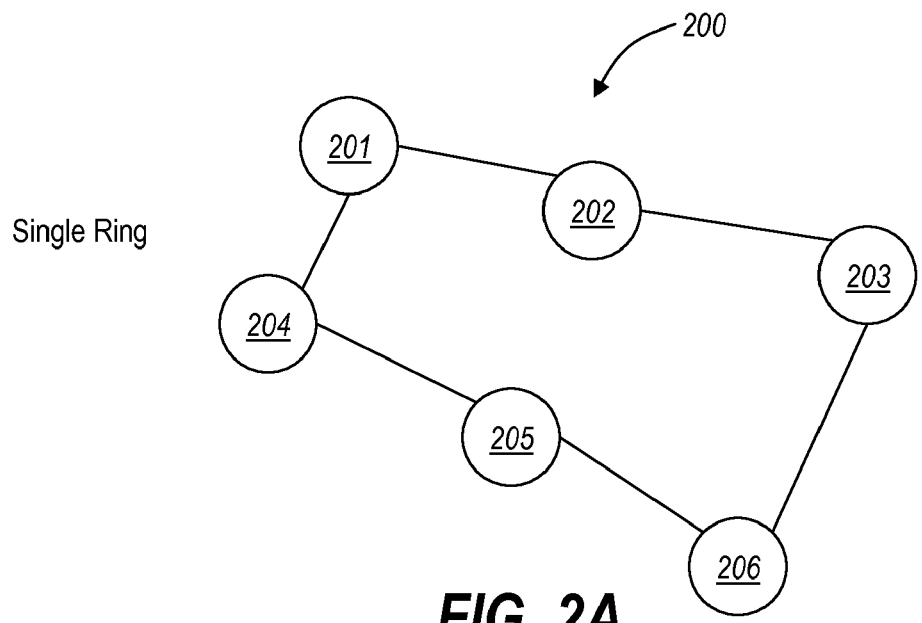
FIG. 2A illustrates a conventional network implemented as a six node BLSR.
Figure 2B:
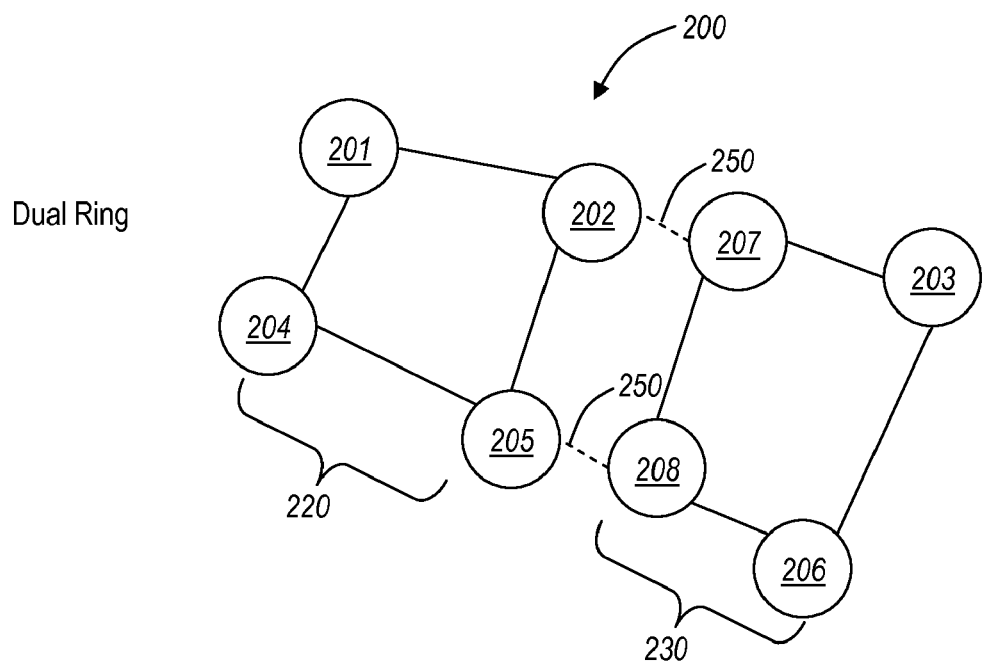
FIG. 2B illustrates a conventional dual ring BLSR mesh.
Figure 2C:
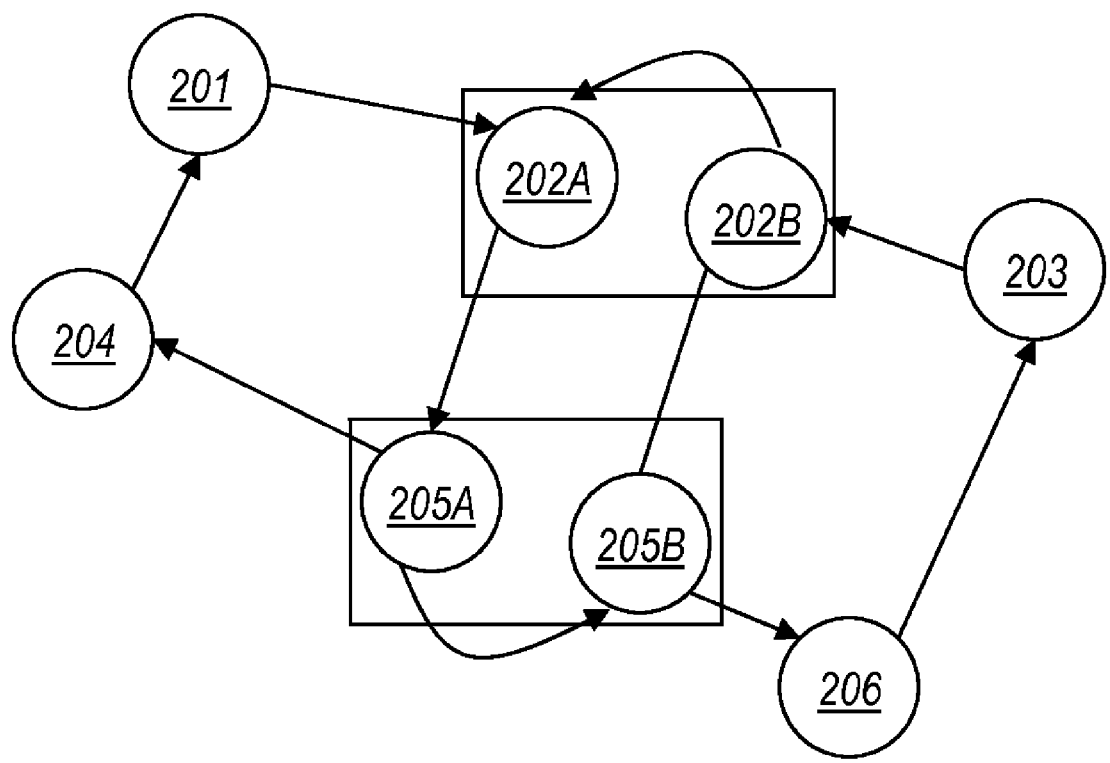
FIG. 2C shows the protection bandwidth for an exemplary embodiment of one two 4 node BLSR networks sharing two of the nodes (202 and 205) and sharing the protection bandwidth between them in accordance with the principles of the invention.

FIGS. 10, 11 and 12 could also be implemented using existing BLSR ADMs that support extra traffic on the protection bandwidth. FIG. 2C shows how the protection traffic would be connected between the two rings. The protection traffic of one ring (right one in FIG. 2C) must be carried as extra traffic on the other ring (left one in FIG. 2C). Therefore, the left ring will be able to preempt the protection bandwidth from the other ring, whether FULL or PARTIAL.

FIG. 2C shows the protection bandwidth for an exemplary embodiment of two 4 node BLSR networks sharing two of the nodes (202 and 205) and sharing the protection bandwidth between them. Therefore, only six node locations are needed, but node locations 202 and 205 can be implemented using traditional BLSR network elements (202A and 205A) while the other two may use the network elements capable of full or partial rings: (202B and 205B). Nodes 201, 202A, 205A and 204 make up the ring on the left. Nodes 202B, 203, 206, and 205B make up the ring on the right. Node locations 202 and 205 are shared between both rings. The shared protection fiber is between nodes 202A and 205A. Thus, instead of needing 8 fibers (in the 4F BLSR case), only 6 fibers are needed on this span if these are two FULL rings, 4 fibers if one FULL and one PARTIAL, and only 2 fibers if these are two PARTIAL rings. In using traditional BLSR network elements for 202A and 205A, the protection traffic from 202B and 205B (shown as an arc) must be carried as extra traffic on 202A and 205A, respectively. Thus, the left ring has higher priority over the bandwidth between nodes 202A and 205A since the protection traffic from nodes 202B and 205B is carried as a lower priority extra traffic on the left ring.

All of these configurations can also be implemented electrically using a generic N×N crossconnect. Using a generic N×N crossconnect allows the connection of the various ADMs to be done automatically without any external physical to be configured. This would allow the network configurations to be changed remotely and automatically.

Figure 3A:
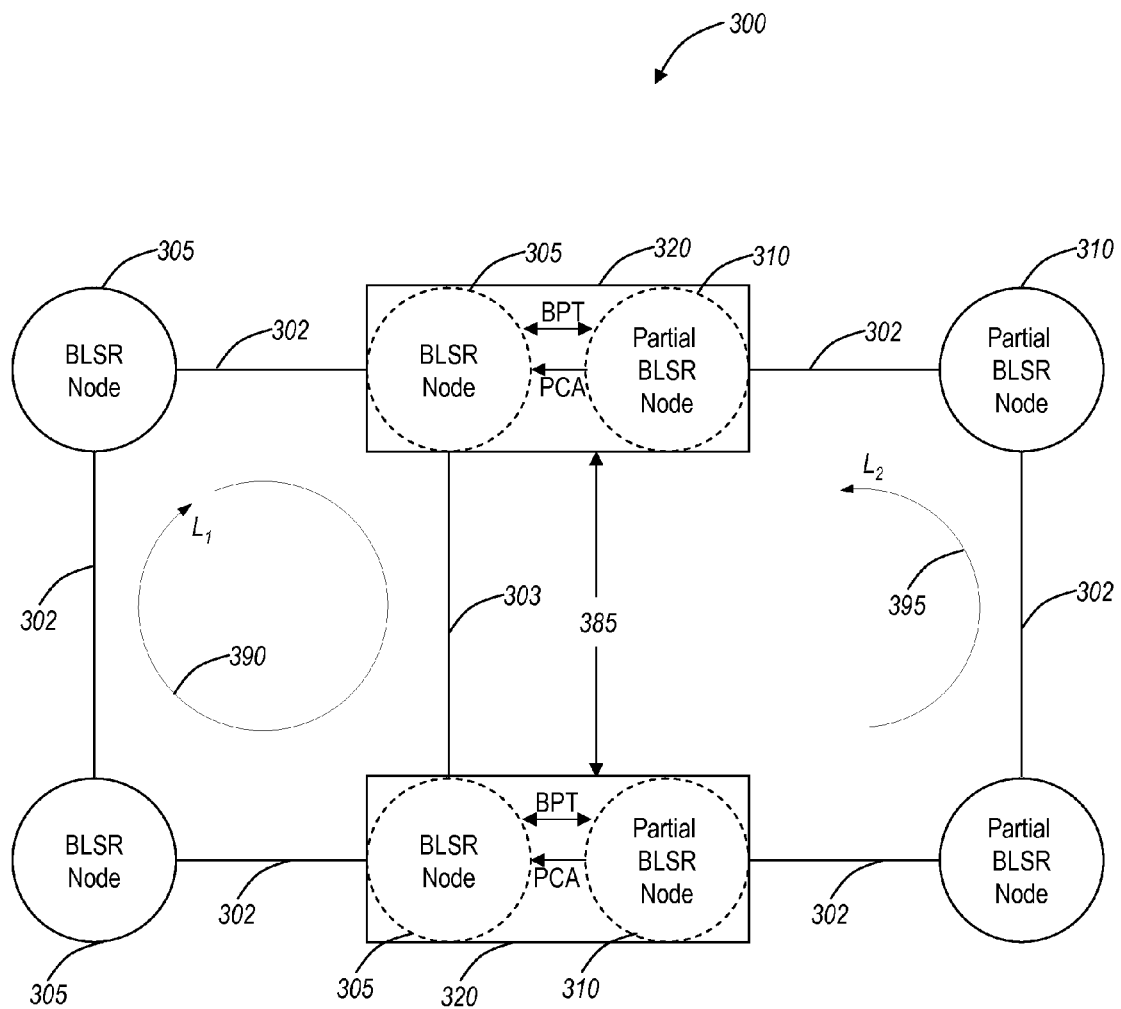
FIG. 3A is a block diagram of one embodiment of a network accord with the present invention.

In general, two rings may be connected together to share protection traffic on a common span. Referring to FIG. 3A, a BLSM network 300 comprises a first BLSR 390 comprised of at least one node 305 coupled by optical fiber spans 302. Additionally, first BLSR 390 includes two common nodes 320 and at least one span 303 coupling the common nodes 320.

A second BLSR 395 comprises at least one node 310 coupled by optical fiber spans 302 and common nodes 320. Second BLSR 395 is a partial BLSR (P-BLSR) for working traffic in that all of the optical paths for working traffic exclude the span 303 between common nodes 320.

The common (shared) section 385 includes two common nodes 320 of third degree or higher. Each span 303 between the common nodes 320 has an appropriate number of fibers for BLSR protection. In a 2F-BLSR implementation, span 303 has two fibers whereas in a 4F-BLSR implementation span 303 has four fibers. It will be understood that an intermediate node(s) and associated fiber spans (not shown) may be included in the common section 385 between common nodes 320.

The BLSR nodes 310 of second BLSR 395 may be conventional BLSR nodes provisioned and configured to have working traffic along a partial (incomplete) ring exclusive of the common span 303. First BLSR 390 is provisioned to permit a full loop, L1, for working traffic if it is a full ring, i.e., BLSR 390 permits optical paths for working traffic that include span 303. Second BLSR 395 is provisioned to permit a partial loop, L2, for working traffic, i.e., in second BLSR 395 none of the optical paths for working traffic include shared span 303 between the common nodes 320.

Connection Between Rings

Figure 3B:
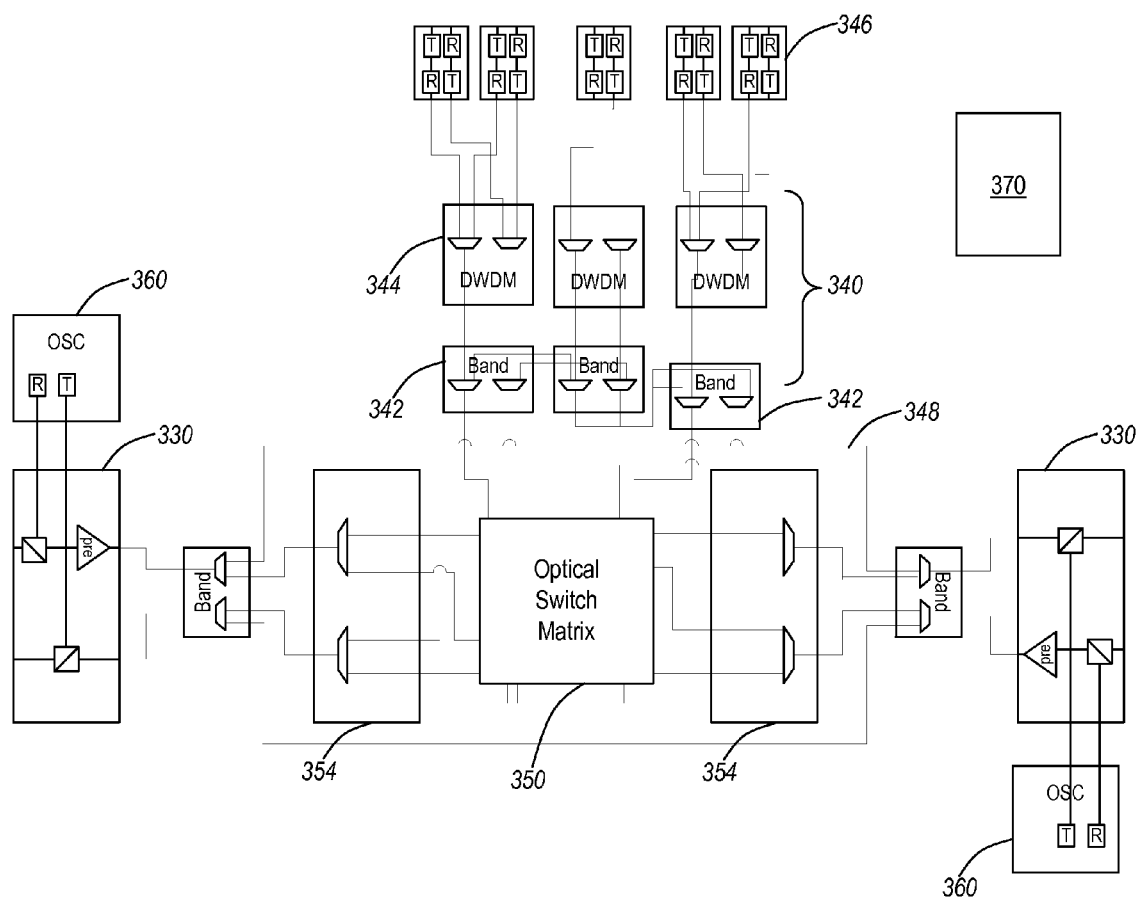
FIG. 3B is a block diagram of an exemplary BLSR node according to the principles of the invention for the network of FIG. 3A.
Figure 3C:
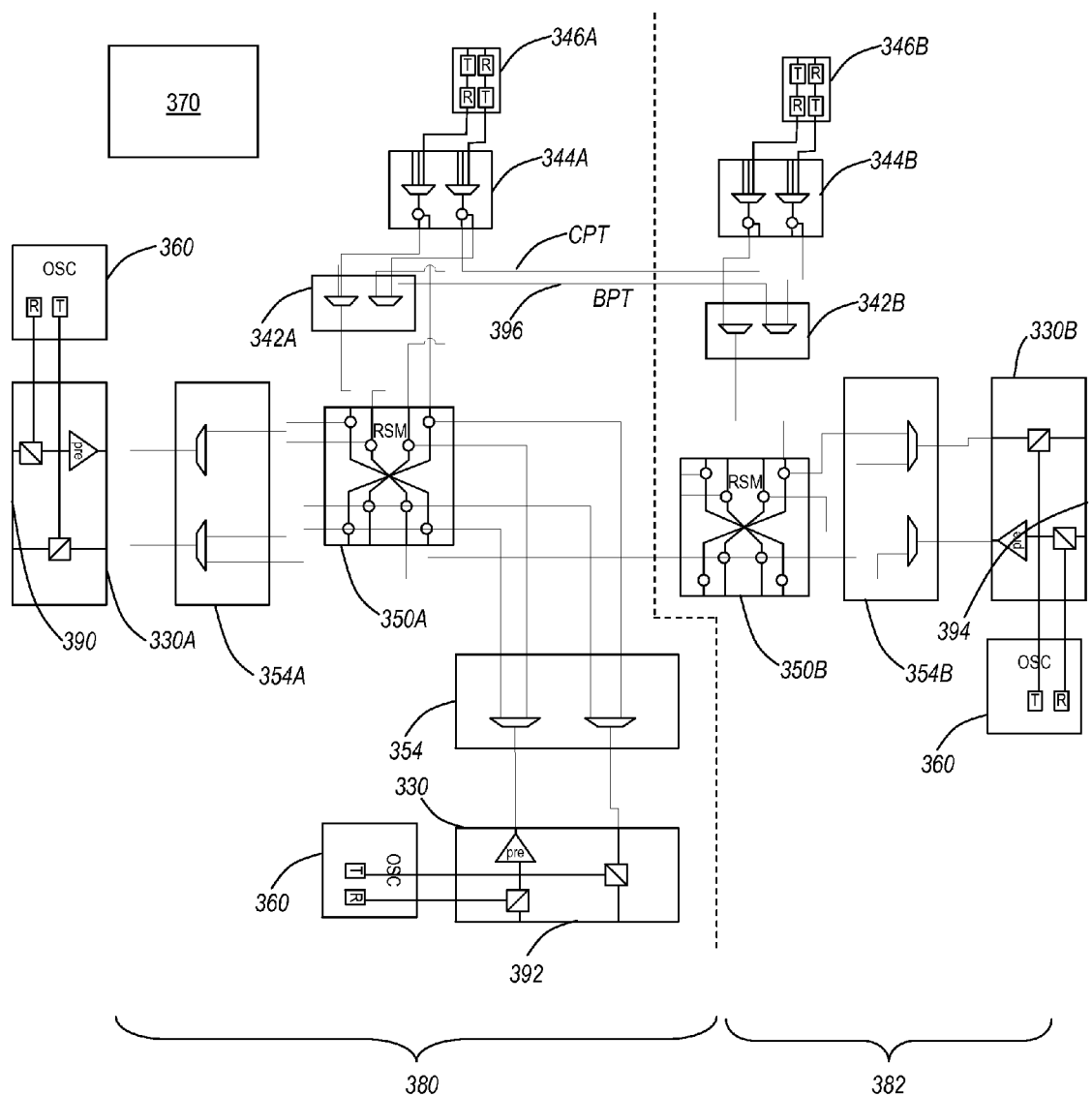
FIG. 3C is a block diagram showing an exemplary common node according to the principles of the invention for the network of FIG. 3A.

As indicated in FIG. 3A, the common nodes of an optical BLSR 320 may be configured to permit a number of band pass throughs (BPT) of selected bands or a number of channel pass throughs (CPT 397 as shown in FIG. 3C) of selected channels between the first and second BLSRs. In an electrical implementation, a crossconnect or ADM switch would be used to connect the traffic between the first and second BLSRs.

Additionally, the common node is configured to permit the second BLSR 395 to use the protection channel access (PCA) bandwidth of intervening span 303 to direct protection traffic through span 303 during a line or node failure of second BLSR 395. The protection bandwidth associated with span 303 must be used consistently for both rings. For an optical 2F-BLSR implementation, second BLSR 395 utilizes the same conjugate wavelengths and protection direction (e.g., CW or CCW) of a fiber as for the first BLSR 390. This is necessary as half of the traffic is allocated for working (1512) and half for protection (1513). Since the network element does not have the means to change the wavelength of a circuit, the same wavelength must be used for working in one direction (CW or CCW) on the second ring as is used by protection of the first ring in the opposite direction (CCW or CW, respectively). This is not important in an electrical implementation of 2F-BLSR as a non-blocking switch fabric can change the time slot. For a 4F-BLSR (electrical or optical), the second BLSR 395 utilizes a protection fiber with the appropriate associated direction (CW or CCW) assigned for providing protection bandwidth for first BLSR 390. In the four fiber case, all wavelengths are supported in both CW and CCW directions.

Figures 1A, 1B:
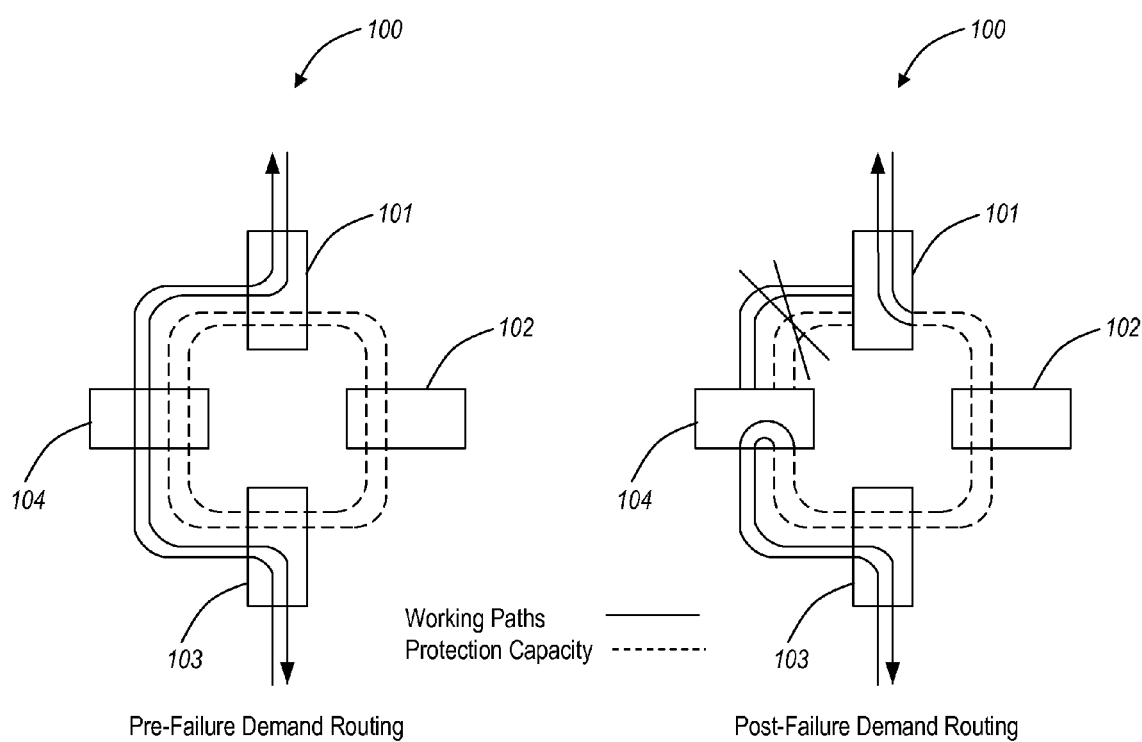
FIG. 1A illustrates pre-failure demand routing in conventional BLSR networks.
FIG. 1B illustrates post-failure demand routing in conventional BLSR networks.
Figure 1C:
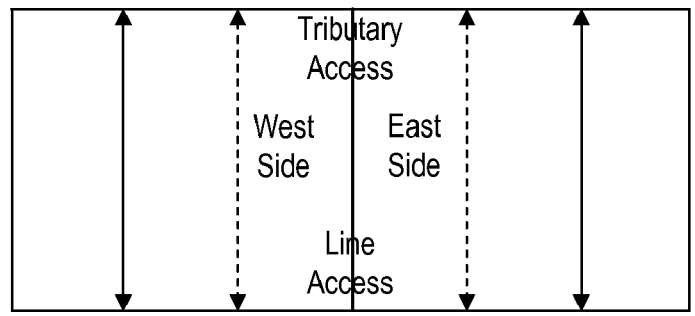
FIGS. 1C-G illustrate five conventional modes of operation for a ring switch module supporting a conventional BLSR network.
Figure 1D:
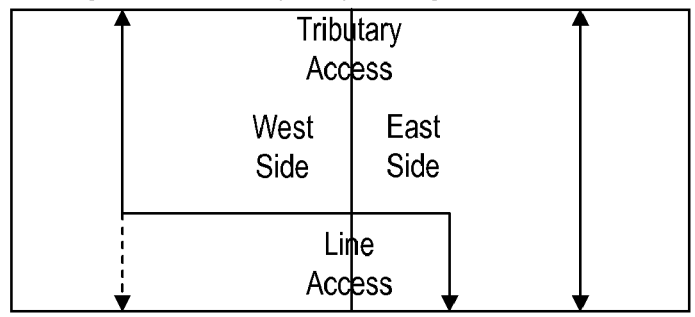
Figure 1E:
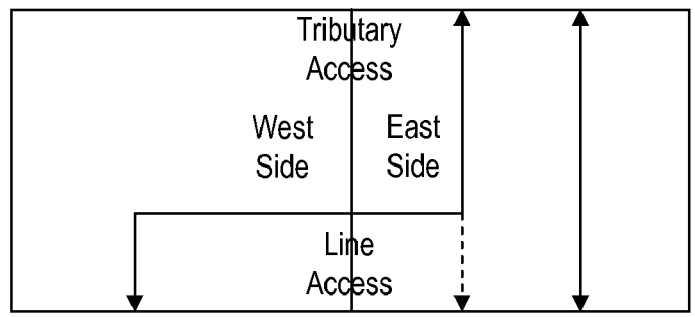
Figure 1F:
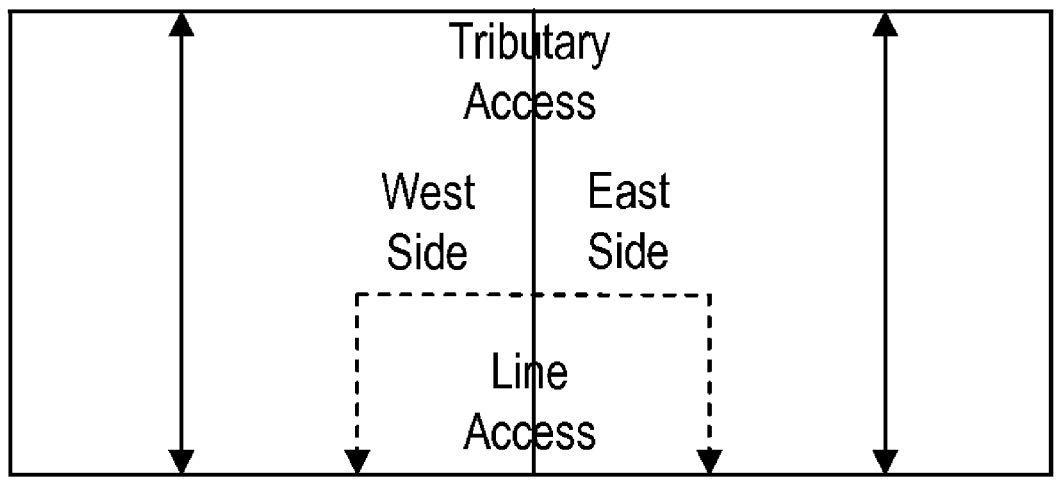
Figure 1G:
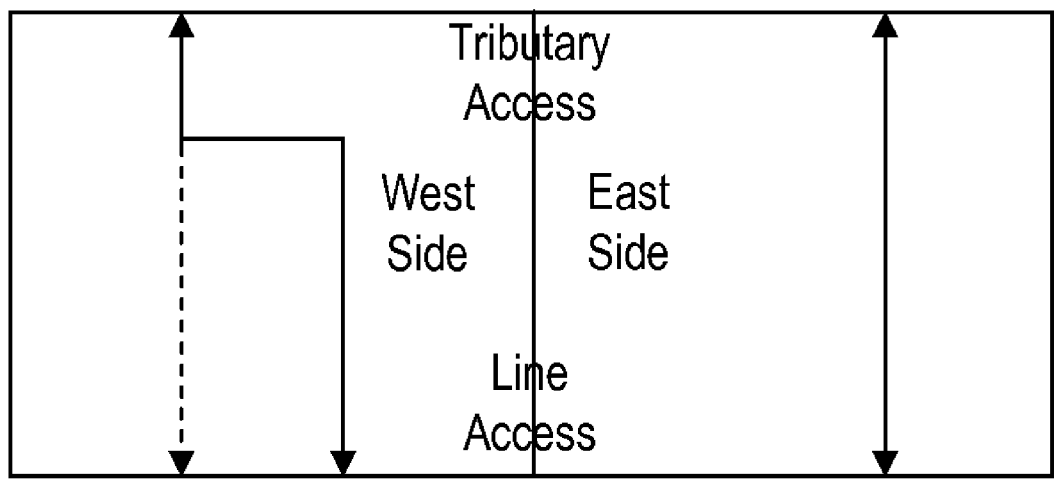

Each node 305 or 310 includes at least one ring switch module (RSM 350) to implement one of the four basic functions shown in FIG. 1C-1F plus the span-switch (FIG. 1G) if implementing a 4F BLSR in response to a line fault detected in the network 300. This permits protected traffic to be routed around the ring at the headend nodes of a span failure in accord with BLSR protection switching. FIG. 3B is a block diagram of an exemplary node 305 or 310. Each node 305 may include line cards 330 for each port having appropriate optical pre-amplifiers or post-amplifiers. If this is implemented as an optical switch, an optical add/drop multiplexer 340 may comprise band 342 and channel 344 multiplexers/demultiplexers coupled to transponders 346 for communicating with a tributary network. It will be understood that the optical add/drop multiplexer may have band or channel multiplexers/demultiplexers coupled 348 to permit band or channel pass-through.

An optical version of the ring switch matrix 350, also known as a ring switch module (RSM) permits a line switch to be implemented responsive to detecting a protection condition. Additional multiplex units (working protect switch modules) 354 are preferably included to facilitate making a line switch. For an optical 2F-BLSR implementation, each node may be configured to redirect traffic onto protection bandwidth in appropriate conjugate wavelengths. Again, this is not needed for an electrical 2F-BLSR implementation.

Node Administration and Communication

The nodes preferably include node administration and communications capability. Each node preferably includes an inter-node communications capability, such as using the conventional SONET DCC or in the optical implementation, a conventional optical supervisory channel (OSC) module 360 to permit the nodes to exchange information required to coordinate line switches. Each node may also include an administrative complex 370 that administers the node. For example, the administrative complex 370 may include hardware and/or software for implementing a state machine for implementing a ring switch. For example, a node may implement a line switch to redirect working traffic responsive to detecting a loss-of-signal or a degradation of signal in an upstream node.

The administrative complex 370 is preferably configured to receive provisioning information (e.g., from an element management system) to implement services between nodes. The provisioning data includes a traffic map of traffic between source nodes and destination nodes. For example, each node may be provisioned with a channel map of wavelength channels to be added, dropped, or passed through to other nodes. The administrative complex may also adjust the operation of variable optical attenuators (VOAs) associated with one or more optical amplifiers to attain a desired degree of optical amplification.

Optical Bypass

In the optical implementation, the common node 320 may include optical regeneration elements for optical-electrical-optical to permit transfer of data between rings or to regenerate wavelength channels of second BLSR 395 for transmission on span 303 (e.g., on conjugate wavelengths for 2F-BLSR). The interconnection of multiple optical tributaries and lines may be accomplished with a single N×N optical space switch. However, this is not required and in many applications it is desirable to have BPT to transfer an entire band or CPT to transfer a single channel between rings in the optical domain.

FIG. 3C shows one embodiment of a third degree common node 320 with optical domain BPT. A first portion 380 comprises a full BSLR node, including line cards 330 for two ports 390 and 392. A second portion 382 comprise a BLSR node components including a line card 330 for coupling signals to a port 394, a WPS 354, and OADM components 342, 344, and 346. The protection traffic of optical switch matrix 350-B and WPS 354 is coupled to the protection channel access (PCA) bandwidth of the optical switch matrix 350-A of first portion 380. This permits protection traffic associated with optical channel entering first portion 382 via port 394 or originating from transponder 346-B exiting via port 392. An appropriate connection 396 is made for BPT between the OADMs of the first and second portions. A variable optical attenuator (VOA) (not shown) may be included to adjust power levels during a ring switch.

Protection Operation

FIG. 3A implements a shared protection of a single FULL ring and a single PARTIAL ring. Referring to FIG. 3A, first BLSR 390 has both working and protection traffic traversing the complete loop, L1, comprised of nodes 305 and common nodes 320. Second BLSR 395 has working traffic traversing a partial loop, L2, between common nodes 320, exclusive of the span 303. In the event of a line fault associated with a span in first loop, L1, BLSR 390 functions as an independent BLSR and switches working traffic onto its protection bandwidth (e.g., via 350-A as a switch matrix or as a generic N×N crossconnect switch). In the event of a line fault or signal degradation along a span or node of second BLSR 395, a line switch (e.g., via switch matrix or crossconnect switch 350-B) allows the protection bandwidth associated with the common section 385 to be used for BLSR 395, emulating the protection modality of a full BLSR. Thus, while BLSR 395 functions as a partial ring for working traffic, it emulates a full BLSR in regards to protection traffic.

For a 2 fiber optical BLSR network, any protection traffic on a particular wavelength for PARTIAL BLSR flowing through span 303 must also have the protection wavelengths travel in a direction consistent with the direction assigned for protection traffic in BLSR 390. For example, if a fiber of span 303 has protection traffic for a particular wavelength traveling in a CCW direction for first BLSR 390, protection traffic for second BLSR 395 on the same wavelength must also flow in the same direction through the fiber since the opposite direction will reserve the same wavelengths for working. An electrical implementation does not have this restriction if it uses a non-blocking switching fabric.

For an optical BLSR, switching working traffic of second BLSR 395 to the common section 385 increases the total light power flowing through span 303 and any associated optical amplifiers, such as optical amplifiers within common nodes 320. Dynamic adjustment of the optical amplification in first BLSR 390 and second BLSR 395 may be required to account for nonlinear effects of the optical amplifiers, such as a decrease in optical gain at high (total) input power levels.

For example, erbium doped fiber amplifiers (EDFAs) have a saturable output power. Some optical networks include techniques for regulating the input/output power of optical amplifiers in the network so that appropriate ranges of input/output power levels are maintained at each optical amplifier, what is sometimes known as "power balancing." Examples include the power management algorithms described in U.S. Pat. Nos. 5,986,783 and 6,046,833, the contents of which are hereby incorporated by reference. Power management algorithms typically require information regarding the number of wavelength channels and the power associated with each channel.

Consequently, in one embodiment in which optical wavelength channels of second BLSR 395 are optically switched onto common section 385, the second BLSR 395 communicates a line switching even to the BLSR. Each node of BLSR 390 and BLSR 395 may then adjust optical amplification and/or attenuation to avoid deleterious effects in the optical amplifiers of BLSR 390 and BLSR 395. For example, a line switching event in second BLSR 395 may be communicated to the nodes of the network using an inter-node communications channel (e.g., an OSC channel). For example, the common nodes 320 may communicate a line-switching event to BLSRs 390 and 395.

Alternatively, if an OEO regenerator in the common nodes is used to regenerate protection traffic along the common section, the administrative complex 370 of the common node preferably takes into account the total power being launched into the optical fiber and optical amplifiers of the common section 385 when performing a power management algorithm for BLSR 390.

Although simultaneous span or node failures in BLSR 390 and BLSR 395 are statistically unlikely, a protection hierarchy is preferably included to account for this possibility. For example, in one embodiment, the protection bandwidth is associated with BLSR 390 and therefore, BLSR 390 will preempt the protection bandwidth in the event of simultaneous span failures in BLSR 390 and BLSR 395. In the event of a simultaneous span failure of BLSR 390 and PARTIAL BLSR 395, traffic on PARTIAL BLSR 395 requiring redirection through the common section between 302 and 305 would be preempted and dropped (lost) to preserve the protection bandwidth for BLSR 390.

The hierarchy could be implemented several different ways. In one embodiment, the common node monitors the utilization of protection bandwidth in BLSR 390 and permits a switch of protection traffic from BLSR 395 to the common span 303 if BLSR is in a normal mode not requiring the protection bandwidth of span 303.

Alternatively, inter-node communication may be used to implement the hierarchy. For example, BLSR 390 and BLSR 395 may generate network status messages received by each common node. For this embodiment, The administrative complex 270 of each node is provisioned to check with its shared node and would decide whether to pass through traffic from BLSR 395 through the common section only if network status messages from BLSR 390 indicated that BLSR was operating in a normal state not requiring the protection bandwidth of the common section.

In another embodiment, the administrative complex 270 of each node would communicate with one another and would decide which ring would be restored based on configurable priority and allow only that ring to use the common section As indicated in FIG. 3A, the common nodes are configured to permit connections (such as STS 1 cross-connects or band pass through) between BLSR 390 and BLSR 395. Referring to FIG. 3B, the common nodes may, for example, receive provisioning information to determine optical wavelength channels to be passed through between the rings using SONET ADMs or optical add drop multiplexers (OADMs). In one embodiment, the common nodes include optical-to-electrical-to-optical (OEO) converters configured to receive each pass-through wavelength from an OADM, regenerate the data in the same or different wavelength, and add the wavelength to the other ring. In an alternate embodiment, the common nodes have OADMs coupled to permit BPT to occur in the optical domain.

Flow Chart of Switching Operation

Figure 4:
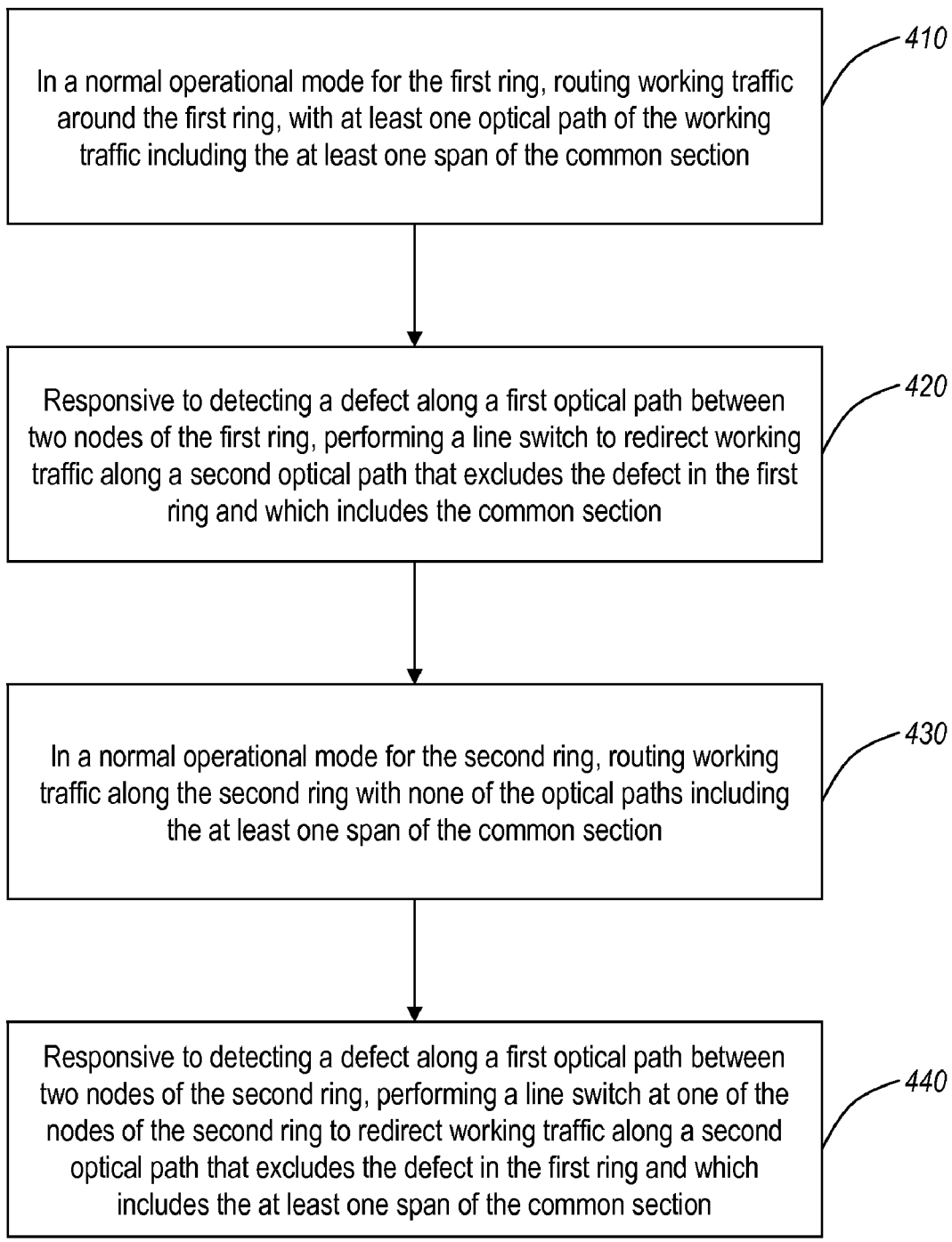
FIG. 4 is a flow chart illustrating one method of allocating protection bandwidth according to the principles of the invention.

FIG. 4 is a flow chart illustrating an exemplary method of operation. In a normal operational mode for the first ring, working traffic is routed around the first ring 410, with at least one optical path of the working traffic including the at least one span of the common section. Responsive to detecting a defect along a first optical path between two nodes of the first ring, a line switch is performed 420 at one of the nodes of the first ring to redirect working traffic along a second optical path that excludes the defect in the first ring and which includes the common section. In a normal operational mode for the second ring 430, working traffic is routed in both directions of the second ring with none of the optical paths including the at least one span of the common section. Responsive to detecting a defect along a first optical path between two nodes of the second ring 440, performing a line switch at one of the nodes of the second ring to redirect working traffic along a second optical path that excludes the defect in the first ring and which includes the common section.

Mesh Operation

Figure 5A:
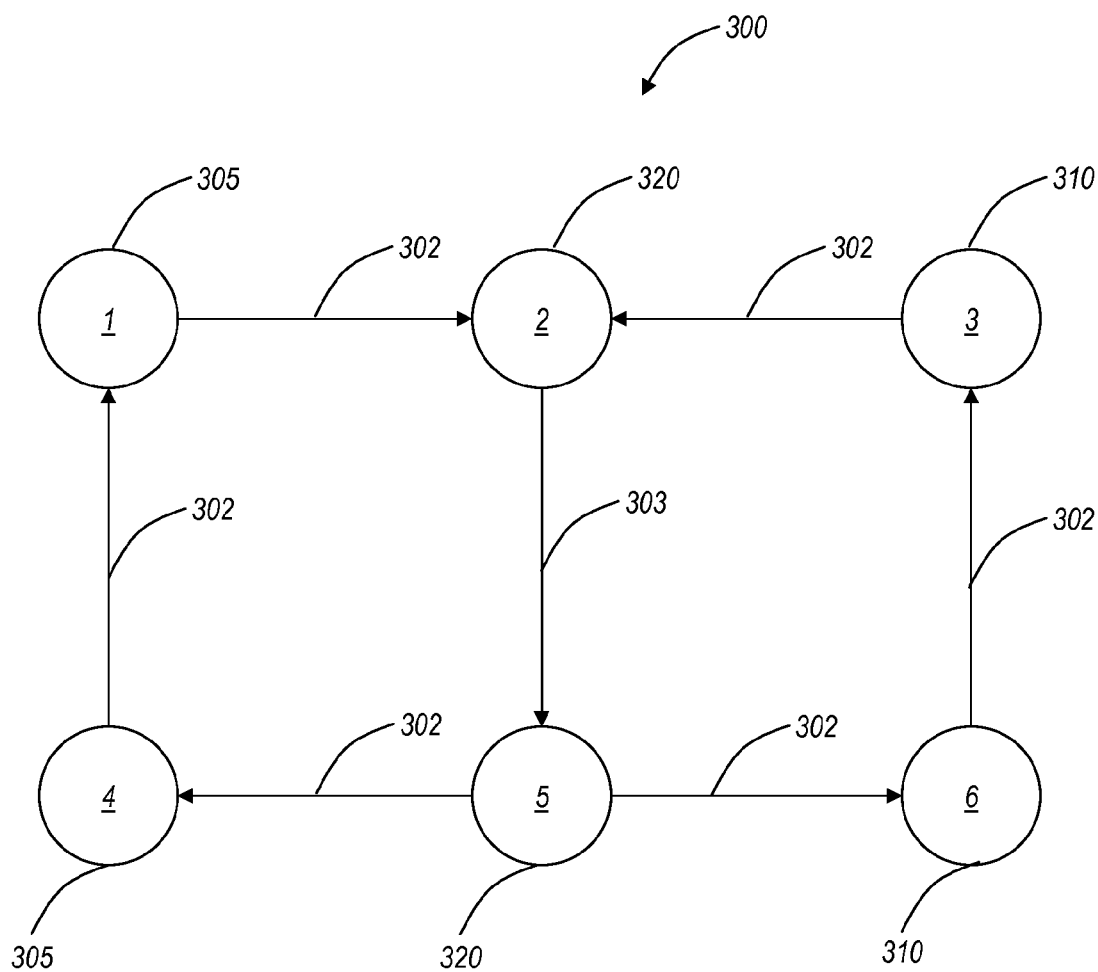
FIG. 5A shows an exemplary mesh network in accord with the present invention with sequential numbers for describing node traffic superimposed.
Figure 5B:
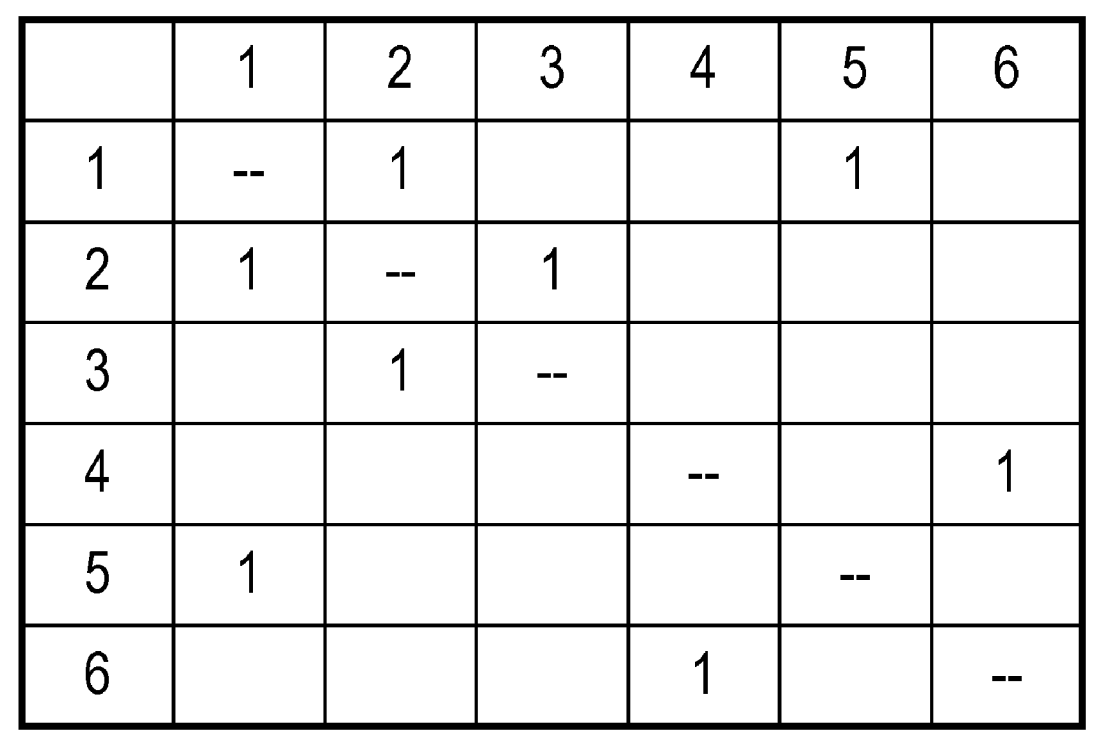
Figure 5C:
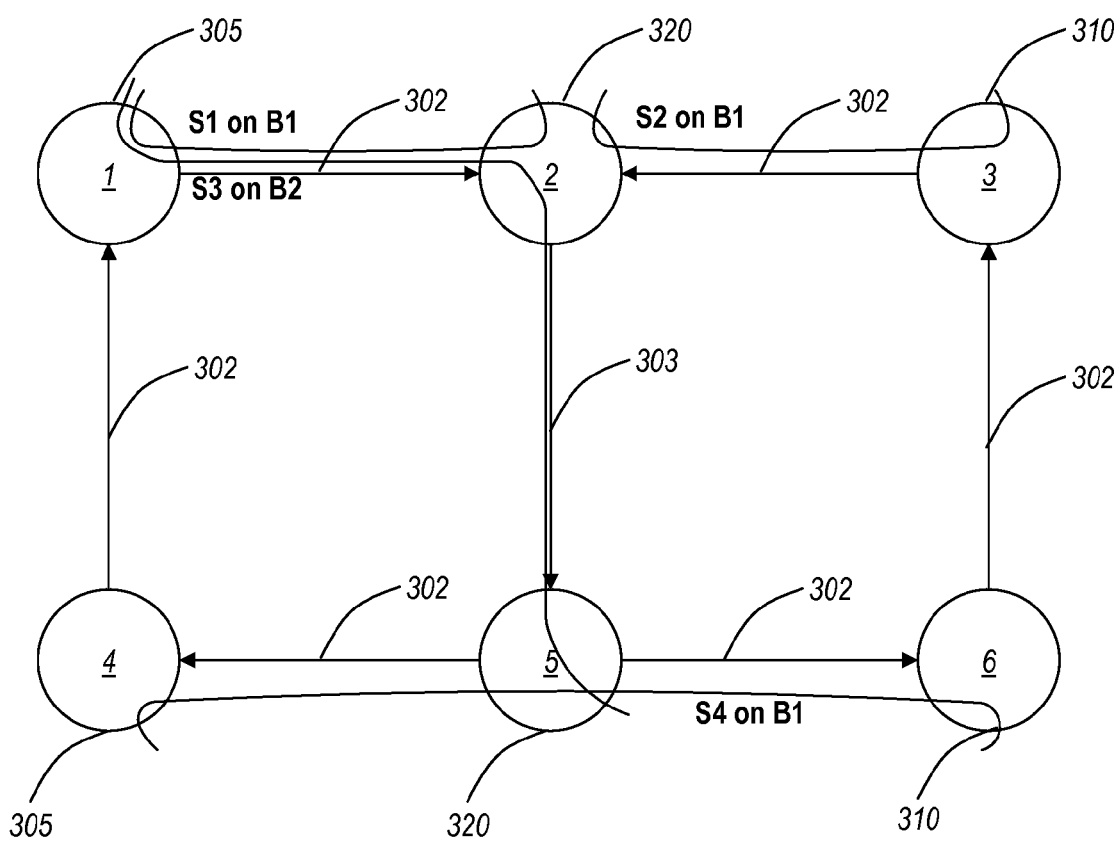
FIG. 5C shows a traffic overlay according to the principles of the invention for the network of FIG. 5A.

FIGS. 5A-5F illustrate exemplary traffic patterns and optical paths between source and destination nodes of a BLSM network combined of a single FULL ring and a single PARTIAL ring sharing protection bandwidth. These diagrams show normal operation and several different line fault conditions. FIG. 5A is an illustrative BLSM network 300. For the purposes of illustration, each node has two numbers associated with it, a first number (305, 310, or 320) indicating the type of node and a second number (1-6) for illustrating a traffic matrix. FIG. 5B shows an illustrative traffic matrix for network 300 with services (S) provided on different channels between source and destination nodes. FIG. 5C shows an exemplary traffic overlay for a normal mode of operation for BLSR 390 and BLSR 395. Exemplary optical paths between source and destination nodes to implement the traffic matrix are shown. Note that a circuit pass through occurs at node 5 between the two rings. This can be a connection between the Add/Drop Multiplexers with a physical patch on the tributary side. This also could be implemented in the optical domain as a band or channel pass-through, or in the electrical domain with a N×N crossconnect.

Figure 5D:
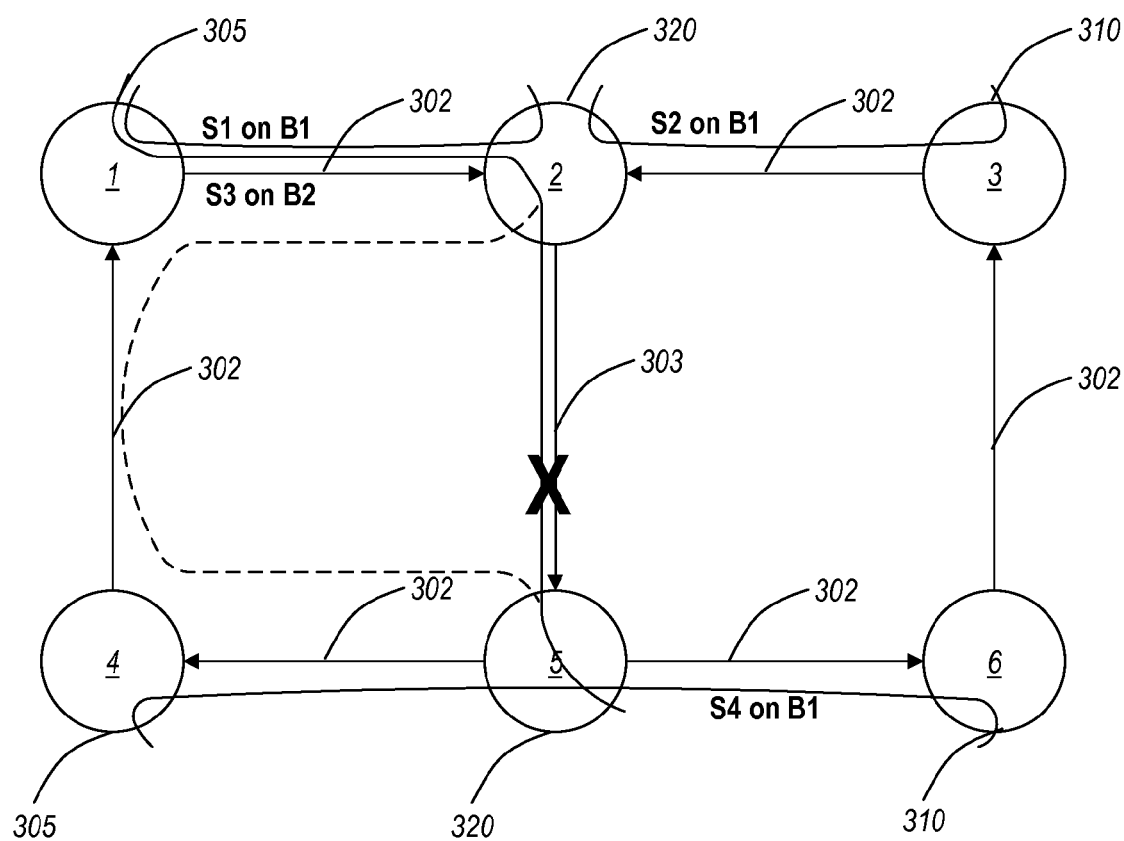
FIG. 5D illustrates traffic on the network of FIG. 5A for a first span failure further illustrating the principles of the invention.
Figure 5E:
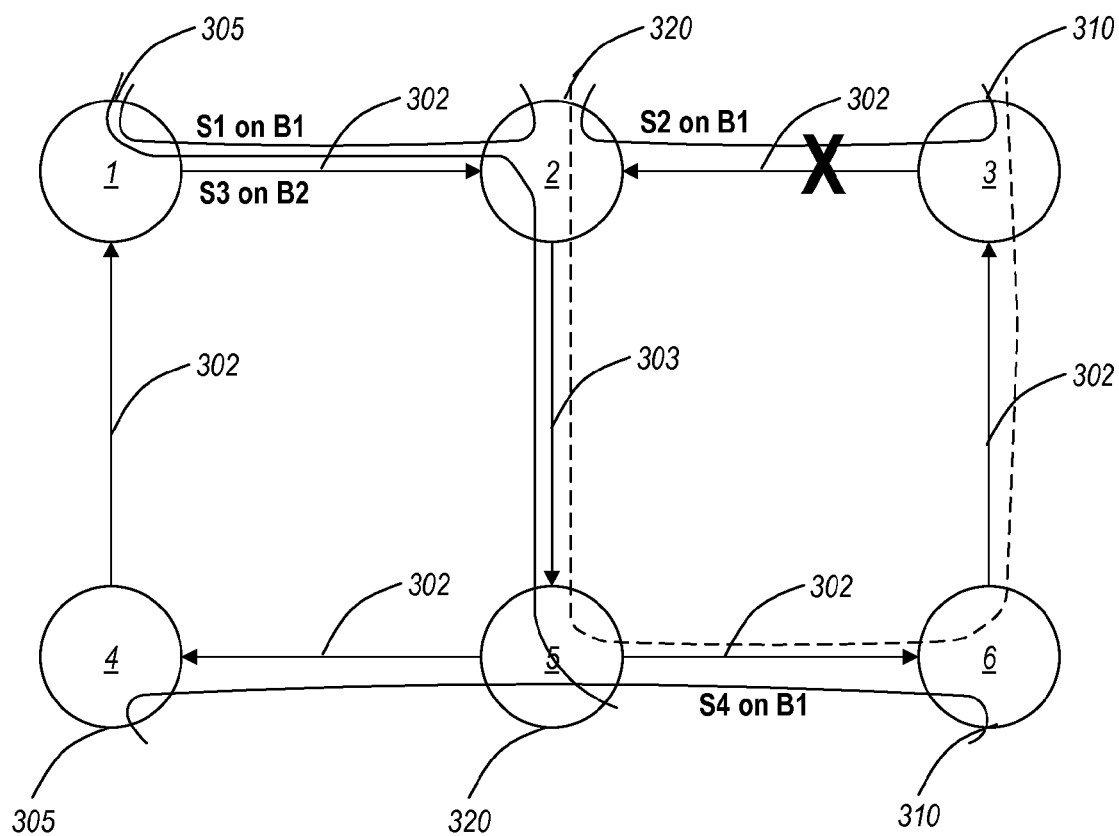
FIG. 5E illustrates traffic on the network of FIG. 5A for a second span failure further illustrating the principles of the invention.

FIG. 5D illustrates an exemplary redirection of traffic on BLSR 390 for a span failure between nodes 2 and 5. BLSR 390 provides BLSR protection for line failures. FIG. 5E illustrates a span failure between nodes 2 and 3. For this case, traffic between nodes 2 and 3 is redirected along the common span, e.g., along path 2-5-6-3.

Figure 5F:
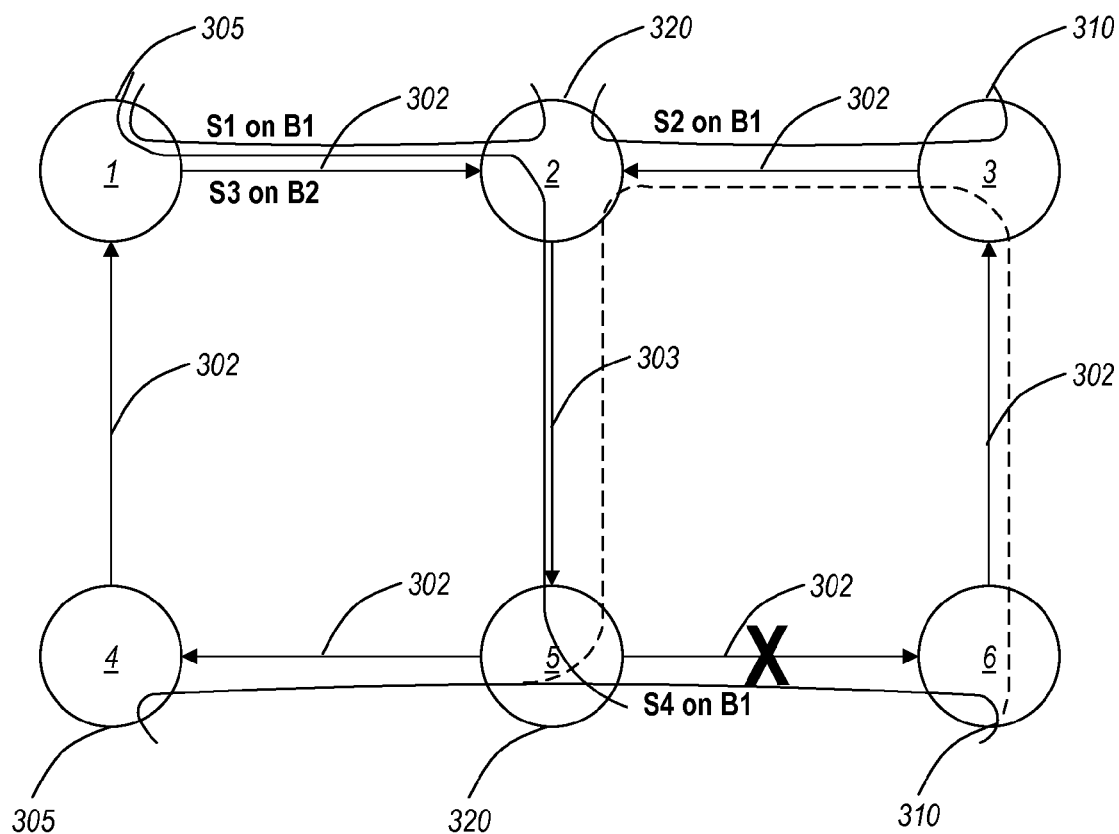
FIG. 5F illustrates traffic on the network of FIG. 5A for a third span failure further illustrating the principles of the invention.

FIG. 5F illustrates a span failure between nodes 5 and 6. For the optical case, the BPT mode at node 5 is directed along the path 5-2-3-6.

It will be understood that the present invention includes embodiments in which the mesh network is segmented into at least one full ring and two or more partial rings.

Figure 6A:
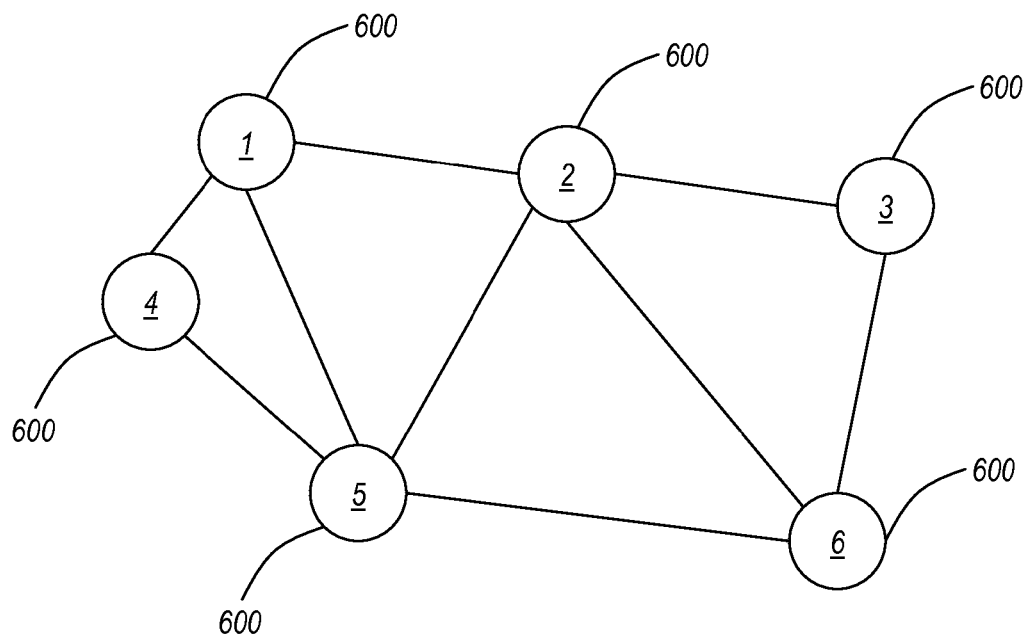
FIG. 6A is a block diagram of a mesh network with fourth degree nodes further illustrating the principles of the invention.

Additionally, embodiments of the present invention include nodes of fourth degree and higher. Referring to FIG. 6A, a mesh network 600 is shown having third and fourth degree optical nodes 600 coupled by spans. Nodes 2 and 5 are fourth degree nodes. A BLSM network is implemented by segmenting the mesh network into a full ring and two or more partial rings.

Figure 6B:
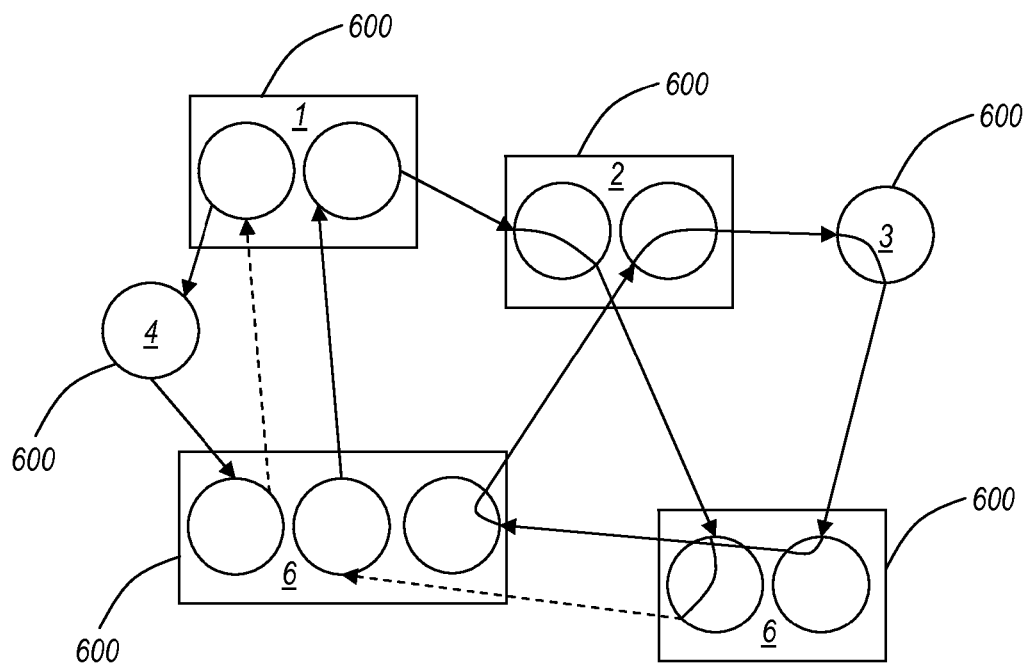
FIG. 6B illustrates how the mesh of FIG. 6A is segmented into full and partial bi-directional line switched rings further illustrating the principles of the invention.
Figure 6C:
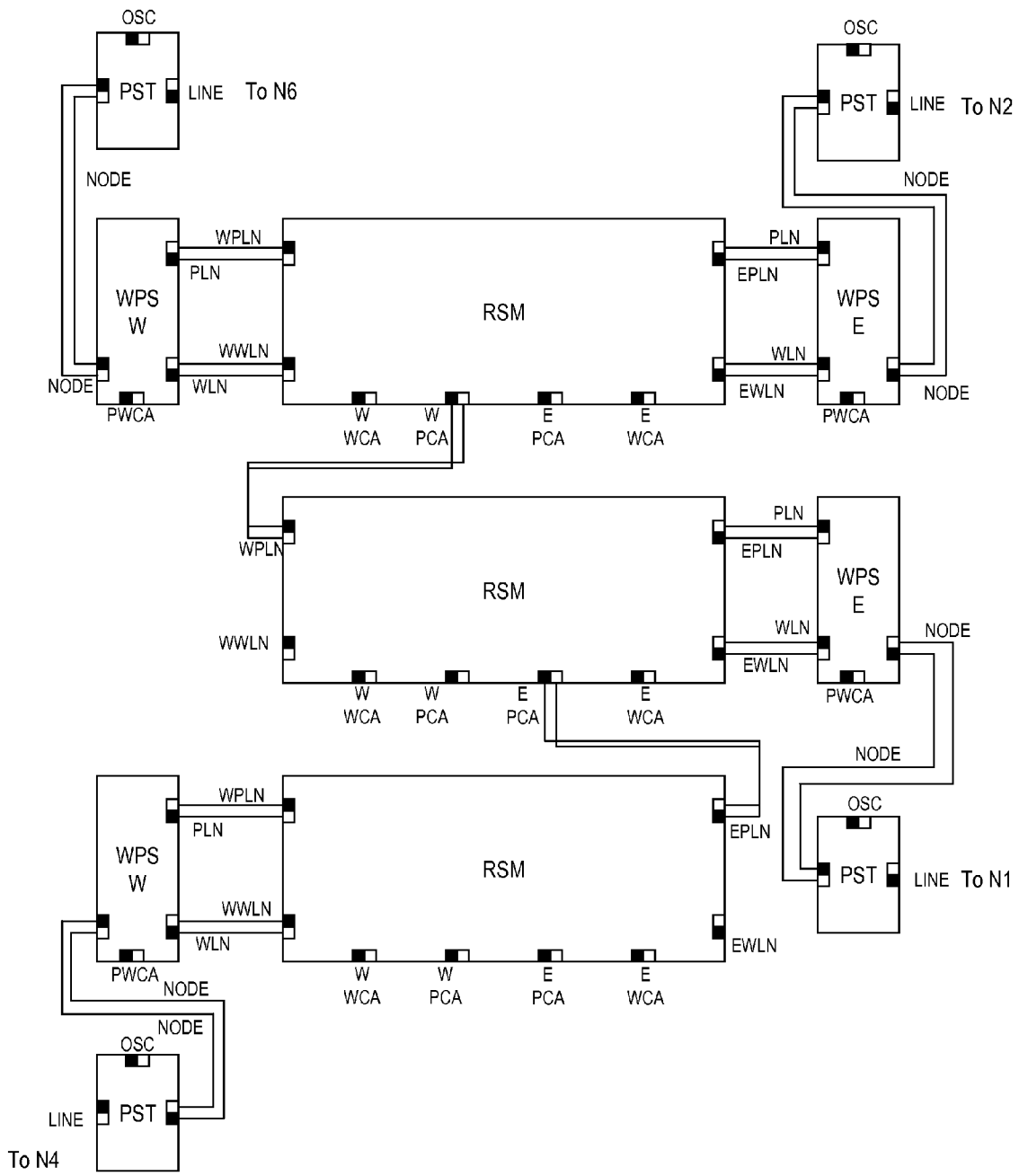
FIG. 6C shows an exemplary embodiment of a fourth degree node for the network of FIG. 6A further illustrating the principles of the invention.

In some embodiments using individual higher order nodes, the mesh may be segmented into independent rings that do not interconnect. Referring to FIG. 6B, nodes 2-3-6-5 comprise a full BLSR ring. Nodes 1-2-6-5 comprise a first partial ring sharing protection bandwidth with the full ring along the span between nodes 5 and 6. Nodes 1-4-5 comprise a second partial ring sharing protection bandwidth with the full ring along the span in common with partial ring 1-2-6-5. FIG. 6C illustrates an embodiment of the fourth degree node of node 5 using RSM modules having protection channel access ports and line ports, and working/protection splitter modules coupled to implement a 2F BLSR operation.

Partial/Asymmetrical BLSR Control and Operation

Figure 14:
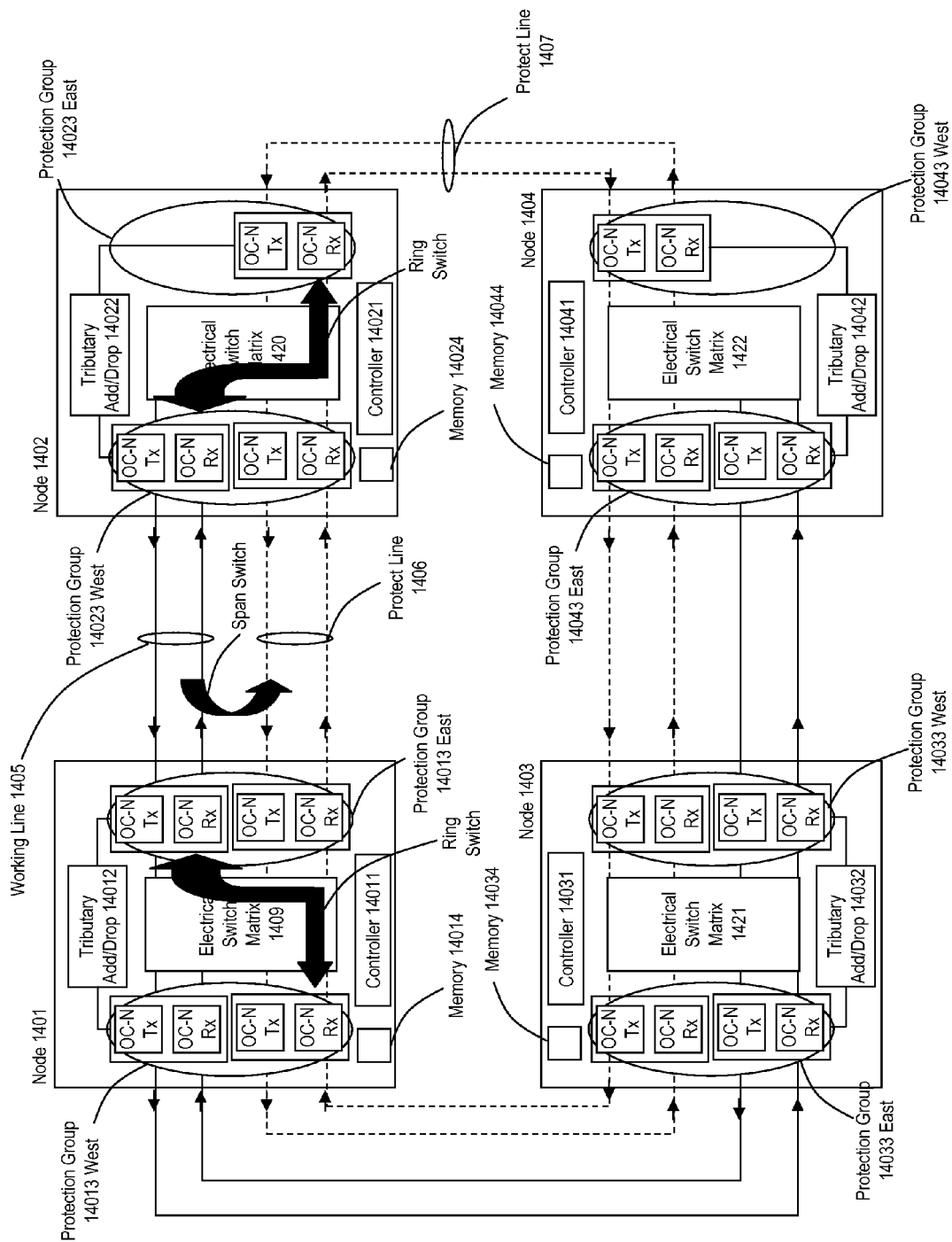
FIG. 14 gives a Partial/Asymmetrical 4F BLSR network topology with detailed nodal and control view of network elements, protection groups, as well as network interfaces and their associated lines according to the principles of the invention.

FIG. 14 illustrates an asymmetrical 4F BLSR network configuration example and individual network element nodal view. There are total four network elements involved in this configuration: Node 1401, 1402, 1403, and 1404. Nodes 1402 and 1404 are asymmetric ring nodes and nodes 1401 and 1403 are symmetric ring nodes. The following will be described as an electrical embodiment; however, this can also be embodied in the optical domain.

As indicated in the FIG. 14, the major components on each node relevant to this discussion are:

Controller (e.g. controller 14011 for node 1401): may be constructed with a microprocessor together with software programs running on the microprocessor. Alternatively, the controllers may be constructed with an ASIC or may utilize the resources of existing CPU(s) of the node.

Memory (e.g. memory 14014 for node 1401 which may be constructed with a conventional memory device): stores configuration information such as protection groups and ring map. The controller uses the information stored in the memory to make decisions on whether to suppress alarms and protection switching operations as further described below.

Electrical Switch Matrix: this is a conventional switch that bridges data traffics (services) between channelized network interfaces (ports) at STS1 (or VC3 in case of SDH) granularity. In the electrical domain, this switch combines the Ring Switch Matrix functions with the Add/Drop Multiplexer functions as described above using one general crossconnect switch.

OC-N Network Interfaces: are the conventional ports connected to external optical fiber. In FIG. 14, only four OC-N ports per node are illustrated but it is to be understood that the number of ports per node may vary).

Tx and Rx: These are conventional transmitter and receivers.

Tributary: another conventional element in and of itself that includes optical and/or electrical interfaces to add/drop traffics to/from the node. Traffic "added" from Tributary is switched onto channelized OC-N and transmitted across optical network. Once the traffic reaches destination node, it will be switched to Tributary port of the destination node, and "dropped" out the network.

Protection Group: is a logical entity that groups network interfaces that participate in protection switches. Each protection group has an East part and a West part. The East part can have up to two pair of ports in this example (two OC-N Txes and two OC-N Rxes), and the same for the West part. The user must select whether there is a working line or not. The assignment of protection groups to ports is particularly useful if there are multiple ports to choose from as in a generic crossconnect. For most of traditional TDM (Time Division Multiplexer), the node only has enough line side interfaces (ports) for one BLSR ring, i.e., four line side interfaces Therefore, the protection group is already fixed to the ports and operation shown in FIGS. 1*c-g*.

To form a BLSR ring, the user should provision a BLSR protection group on each node along the ring. One bi-directional protection port and an optional bi-directional working port must be assigned to each span. The conventional protection group includes four pair interfaces, and they are organized as East and West, such as Protection Group 14013 (East, West), and 14033 (East, West) in FIG. 14.

To reduce cost (or to delay capital expenditure) of fiber, network interfaces, and switch capacity, for low traffic spans, such as span between node 1402 and 1404, only protect fibers and associated interfaces are required to construct the asymmetrical (partial) ring. In this case, the system must support Protection Groups constructed with less than the conventional number of Network Interfaces, such as Protection Group 14023 (East, West), and 14043 (East, West).

After network construction and system provisioning, the controllers 14011, 14021, 10431, and 14041 of Network Nodes 1401, 1402, 1403, and 1404, respectively may run a preparatory communication protocol periodically to discover the ring map and keep track of changes occurred on the network. The controllers 14011, 14021, 10431, and 14041 may also communicate to each other to make sure no configuration mismatches. For example, the network interfaces of Protection Group 14023 East connect to the network interfaces of Protection Group 14043 West via Protect Line 1407. Controllers of Node 1402 and 1404 coordinate with each others information on both sides, and report "Configuration Mismatch" if there is any. For example, if Protection Group 14043 West has more than one pair interfaces, but Protection Group 14023 East has only one pair, mismatch notifications will be generated by Controller 14021 and 14041.

As with conventional 4F BLSR, Partial BLSR provides both span switch and ring switch. If a protection group is configured without a working port, the span switch is not applicable to this protection group and should be disabled by the controller. For any failure occurring on the ring, the working traffic are always protected to the extent possible. For example, if Working Line 1405 fails, its traffic will be switched to its span protection Protect Line 1406. If both Working Line 1405 and Protect Lines 1406 fail, working traffic will be protected via Ring Switch: working traffic on interfaces of Protection Group 14013 East will be switched to the protection interfaces of 14013 West, and carried on the protection lines across the network (longer path). The working traffic suppose to be received by working interfaces of Protection Group 14023 West is received by the same destination node 1402 (via protection interfaces of Protection Group 14023 East).

Partial/Asymmetric BLSR supports the same suite of ring-level administrative controls as conventional BLSR, including:

Forced/Manual switches, including the Clearing of these switches.

Exercise (EXER) functions (EXER-Ring and EXER-Span): Invoke the K1/K2 protocol for a ring switch or a span switch, but do not result in any protection switch of traffic.

Lockout of Protection Span (LP-S): Prevents the use of the span for any protection activity. This essentially prevents ring switches from occurring anywhere in the ring except on the span where LP-S is invoked.

Lockout of Work—Ring/Span Switch (LOW-R/LOW-S): Prevents the working-line over the requested span from using the protect-line for a span switch.

In other words, the ring nodes of a partial BLSR according to the invention are configured to provide the above-listed and conventional BLSR control functionality.

One key difference for partial BLSR is that the following commands will not apply to protection group and span with no working interfaces populated/configured. Specifically, asymmetric ring nodes receiving these commands intended for an asymmetric span will elegantly reject (or ignore) these commands:

1) Forced (span or ring) Switch
2) Manual (span or ring) Switch
3) Exercise (span or ring)

In addition:

Asymmetrical rings follow all pre-emption and prioritization criteria consistent with conventional BLSR.

SF-S (Signal Failure on Span, caused by LOS (loss of signal), LOF (loss of frame), AIS-L(Alarm Indication Signal detected at the SONET line layer), or SF-BER (signal failure on bit error rate) and SD-S (Signal Degrade condition on Span, using BER) operations are not be initiated by the asymmetrical ring nodes due to absence of work line. These operations normally include a protection switching operation such as a span switch or ring switch but such operations are not performed by the asymmetrical ring nodes according to the invention.

SF-S and SD-S operations initiated on symmetrical spans of the asymmetrical ring shall work consistent with conventional BLSR.

SF-R (Signal Failure on Ring) and SD-R (Signal Degrade on Ring) operations including transmitting a protection switch command to the other nodes are not initiated by the asymmetrical ring nodes due to the absence of a work line.

SF-R and SD-R operations are initiated by symmetrical ring nodes of the asymmetrical ring operate in a manner consistent with conventional BLSR operation and control.

Asymmetrical BLSR supports SF-P (Protect Line Signal Failure) and SD-P (Protect Line Signal Degrade) depending on the condition of protection line on an asymmetrical span.

When network traffic demand between 1402 and 1404 increases, Controllers on the nodes allow new Network Interfaces to be "inserted" into Protection Groups to extend or even close Working Arc or Rings without interrupting existing services in real time. The ring map will be updated by communication protocol running on the Controllers 14011, 14021, 10431, and 14041.

Partial/Asymmetrical BLSR is capable of carrying extra traffic on the protect channels. During the protect channel failure or span failure caused ring switch, the extra traffic will be bumped off from the ring, but protected via mesh network protection.

SUMMARY

The present invention provides several benefits. One benefit of the present invention is that a bi-directional line switched PARTIAL ring network may be implemented with less fiber, network interfaces (ports), or switch capacity than a FULL ring which requires working fiber and associated equipment on all spans. Another benefit of the present invention is that a bi-directional line switched mesh network may be implemented using a comparatively small number of nodes and spans. BLSR protection of a mesh is implemented with reduced hardware and requirements. Another benefit of the present invention is that band pass through of wavelength channels between rings may be implemented in the optical domain, which also reduces hardware costs. Still yet another benefit of the present invention is that BLSR protection may be implemented using higher order nodes coupled to more than two spans, permitting complex meshes to be segmented into BLSR rings.

Working spans of Partial rings can be extended to increase capacity and reaches without interrupting the existing services.

The above detailed description is made with respect to the SONET standard but it is to be understood that the teachings of this invention are equally applicable to the SDH network which has many similarities to the SONET network. Although the term "BLSR" is primarily used for SONET the SDH standard more typically refers to the BLSR topology and techniques as MS-SPRing. To simplify the description, all terminologies used across the entire document are SONET based and the term "BLSR" also applies to networks adhering to the SDH standard.

While particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the appended claims.

What is claimed is:

1. A method of allocating protection bandwidth in a mesh network having a first bi-directional ring comprised of a first plurality of nodes coupled by a first plurality of spans and a second bi-directional ring comprised of a second plurality of nodes coupled by a second plurality of spans, the first and second rings sharing a common section comprising at least two common nodes coupled by at least one span, the method comprising:

in a normal operational mode for the first ring, routing working traffic on paths of the first ring with at least one path of the working traffic including the at least one span of the common section, wherein the first ring has a symmetrical arrangement of working and protect ports;

responsive to detecting a defect along a first path of the first ring, performing a line switch in the first ring to redirect working traffic along another path of the first ring that excludes the defect in the first ring and which traverses the common section;

in a normal operational mode for the second ring, routing working traffic on paths of the second ring with none of the working traffic traversing the at least one span of the common section, wherein the second ring has an asymmetrical arrangement of working and protect ports such that the second ring has at least one unconfigured working port that ignores or rejects a received switch command and does not perform a commanded span or ring switch;

responsive to detecting a defect along a path of the second ring, performing a line switch to redirect working traffic along another path of the second ring that excludes the defect in the second ring and which traverses the common section and adjusting optical power of the common section to account for protection traffic of the second ring traversing the common section in the protection mode of the second ring;

wherein the common section is provisioned such that it provides protection for both the first and second rings.

2. The method of claim 1, further comprising:

responsive to detecting a protection switching condition in both the first and second rings, routing protection traffic through the at least one span of the common section only for the first ring.

3. The method of claim 1, further comprising:

in at least one of the common nodes, passing at least one wavelength channel between the rings, the at least one wavelength channel having a source node in one of the rings and a destination node in the other ring.

4. The method of claim 3, wherein the at least one wavelength channel is optically switched between the rings.

5. The method of claim 3, wherein the at least one wavelength channel is passed through by an optical-to-electrical-to-optical converter.

6. The method of claim 1, further comprising:

in at least one of the common nodes, passing at least one timeslot between the rings, the at least one timeslot having a source node in one of the rings and a destination node in the other ring.

7. The method of claim 1, wherein said routing working traffic and said routing protection traffic steps operate on time slot bandwidth units.

8. The method of claim 1, wherein said routing working traffic and said routing protection traffic steps operate on wavelength bandwidth units.

9. The method of claim 1, wherein each of the common nodes in the first and second rings consist of two common nodes and wherein the common nodes belonging to the second ring pass its protection bandwidth to the common nodes belonging to the first ring to be carried as extra traffic on the protection bandwidth.

10. A method of allocating protection bandwidth in a mesh network having a first ring comprised of a first plurality of nodes coupled by a first plurality of spans and a second ring comprised of a second plurality of nodes coupled by a second plurality of spans, the first and second rings sharing a common section comprising least two common nodes coupled by at least one span, the method comprising:

operating the first ring as a bi-directional line switched ring that includes the first plurality of nodes and the common nodes, the first ring having working and protection bandwidth through each of the first plurality of spans and the at least one span between the common nodes, wherein the first ring has a symmetrical arrangement of working and protect ports;

operating the second ring as a bi-directional line switched ring having working traffic in the second plurality of spans exclusive of the at least one span between the common nodes, the second ring having protection traffic through the second plurality of spans and the at least one span between the common nodes responsive to a protection switching event for the second ring and adjusting optical power of the common section to account for protection traffic of the second ring traversing the common section in the protection mode of the second ring, wherein the second ring has an asymmetrical arrangement of working and protect ports such that the second ring has at least one unconfigured working port that ignores or rejects a received switch command and does not perform a commanded span or ring switch;

wherein the common section is provisioned such that it provides protection for both the first and second rings.

11. The method of claim 10, further comprising: in at least one of the common nodes, passing a wavelength channel between the rings, the wavelength channel having a source node in the one of the rings and a destination node in the other ring.

12. The method of claim 11, further comprising: said passing a wavelength channel passing the wavelength channel in the domain.

13. The method of claim 10 further comprising: in at least one of the common nodes, passing at least one timeslot between the rings, the at least one timeslot having a source node in one of the rings and a destination node in the other ring.

14. The method of claim 10, wherein responsive to a protection switching event in both the first and second rings, dropping protection traffic from the second ring.

15. A bi-directional line switched mesh network, comprising:

a first bi-directional line switched ring including a plurality of nodes coupled by spans;

a second bi-directional line switched ring including a plurality of nodes coupled by spans;

the second bi-directional line switched ring sharing a common section with the first bi-directional line switched ring, the common section including at least two common nodes and at least one common span;

the second bi-directional line switched ring having no working traffic traversing the common span of the common section during a normal mode of operation for the second bi-directional line switched ring, and wherein the second bi-directional line switched ring has at least one unconfigured working port that ignores or rejects a received switch command and does not perform a commanded span or ring switch; and the second bi-directional line switched ring sharing protection bandwidth with the first bi-directional line switched ring along the at least one common span of the common section during a protection mode of operation for the second bi-directional line switched ring;

wherein at least one of the nodes comprises:

an internode communication module for receiving messages indicative of whether the second ring is operating in the normal mode or the protection mode; and an optical amplifier whose amplification can be adjusted by a power management module residing in an administrative complex of the node;

the power management module adjusting the optical amplification level of the optical amplifier to account for protection traffic of the second ring traversing the common section in the protection mode of the second ring.

16. The network of claim 15, wherein at least one of the common nodes is configured to transfer a wavelength channel from a source node in bi-directional line switched ring to a destination node in the partial bi-directional line switched ring.

17. The network of claim 15, wherein at least one of the common nodes is configured to transfer a wavelength channel from a source node in the partial bi-directional line switched ring to a destination node in the bi-directional line switched ring.

18. The network of claim 15 further comprising: wherein at least one of the common nodes is configured to pass at least one timeslot from a source node in the partial bi-directional line switched ring to a destination node in the bi-directional line switched ring.

19. The network of claim 15, wherein the rings are configured so that in the event of a fault on both rings only the first bi-directional ring utilizes the protection bandwidth of the common section.

20. The network of claim 15, wherein each of the nodes is coupled by a span having two optical fibers and the protection bandwidth comprises conjugate wavelengths.

21. The network of claim 15, wherein each of the nodes is coupled by a span having two working fibers and two protection fibers.

22. An optical communications system, comprising:
a first optical network including a plurality of first nodes configured as a first bi-directional line switched partial ring, wherein the first bi-directional line switched partial ring has a symmetrical arrangement of working and protect ports;
a second optical network including a plurality of second nodes configured as a second bi-directional line switched partial ring, wherein the second bi-directional line switched partial ring has an asymmetrical arrangement of working and protect ports such that the second ring has at least one unconfigured working port that ignores or rejects a received switch command and does not perform a commanded span or ring switch;
a plurality of shared nodes operatively interconnecting said first and second optical networks, said shared nodes being shared by said first and second optical networks;
at least one shared optical span operatively interconnecting said shared nodes, said shared optical span providing shared optical capacity shared by said first and second optical networks;
said shared nodes and said shared span being configured to share optical protection capacity between the first and second optical networks;
wherein said at least one shared optical span is provisioned such that it provides protection for both said first and second optical networks; and
wherein at least one of said shared nodes comprise:
an internode communication module for receiving messages indicative of whether the second optical network is operating in the normal mode or the protection mode; and
an optical amplifier whose amplification can be adjusted by a power management module residing in an administrative complex of the node;
the power management module adjusting the optical amplification level of the optical amplifier to account for protection traffic of the second optical network traversing the at least one shared optical span in the protection mode of the second optical network.

23. The optical communications system of claim 22, said shared nodes including a non-blocking O-E-O switch operatively connected to said first and second networks and to said shared span; said O-E-O switch providing timeslot switching between said first and second networks and said shared span to support the shared protection capacity on said shared optical span.

24. The optical communications system of claim 22, said shared nodes including an O-O switch operatively connected to said first and second networks and to said shared span, said O-O switch providing wavelength switching between said first and second networks and said shared span to support the shared protection capacity on said shared optical span.

25. The optical communications system of claim 22, wherein at least one of said first or second nodes are used and configured as at least one of said plurality of shared nodes.

26. The optical communications system of claim 22, wherein the plurality of first nodes of said first optical network are configured as a first bi-directional line switched full ring; and
wherein said shared nodes are configured to have working capacity for said first optical network and to not have working capacity for said second optical network.

27. A method of controlling an optical network including a plurality of symmetrical and asymmetrical ring nodes configured as a first bi-directional line switched partial ring, wherein the asymmetrical ring nodes have an asymmetrical arrangement of working and protect ports such that the asymmetrical ring nodes have at least one unconfigured working port and such that the ring is a partial ring and the symmetrical nodes have a symmetrical arrangement of working and protect ports, the method comprising:
receiving a switch command at the asymmetrical ring nodes, the switch command commanding the nodes of the optical network to perform a span or ring switch; and
ignoring or rejecting the received switch command and not performing the commanded span or ring switch at the at least one unconfigured working port of the asymmetrical ring nodes.

28. The method of controlling an optical network according to claim 27,
wherein the switch command is a forced switch command, a manual switch command, or an exercise command.

29. The method of controlling an optical network according to claim 27, further comprising:
receiving a signal failure condition at the asymmetrical ring nodes, wherein the signal failure condition is indicative of a signal failure from at least one of the working ports; and
not initiating a switch command at the at least one unconfigured working port of the asymmetrical ring nodes in response to said receiving step receiving the signal failure condition.

30. The method of controlling an optical network according to claim 27, further comprising:
receiving a signal failure condition at the symmetrical ring nodes, wherein the signal failure condition is indicative of a signal failure from at least one of the working ports; and
initiating a switch command at the symmetrical nodes in response to said receiving step receiving the signal failure condition.

31. The method of controlling an optical network according to claim 27, further comprising:
receiving a signal degraded condition at the asymmetrical ring nodes, wherein the signal degraded condition is indicative of a degraded signal from at least one of the working ports; and
not initiating a switch command at the asymmetrical ring nodes in response to said receiving step receiving the signal degraded condition.

32. The method of controlling an optical network according to claim 27, said ignoring step ignoring the received switch command for one or more protection groups associated with the asymmetrical ring nodes.

* * * * *